US00RE41354E

(19) United States
(12) Reissued Patent
Yamaguchi et al.

(10) Patent Number: US RE41,354 E
(45) Date of Reissued Patent: May 25, 2010

(54) TAPE-SHAPED LABEL PRINTING DEVICE

(75) Inventors: Koshiro Yamaguchi, Kakamigahara (JP); Mitsuharu Hattori, Nagoya (JP)

(73) Assignee: Brother Kogyo Kabushiki Kaisha, Nagoya (JP)

(21) Appl. No.: 11/125,418

(22) Filed: May 10, 2005

Related U.S. Patent Documents

Reissue of:
(64) Patent No.: 6,709,179
Issued: Mar. 23, 2004
Appl. No.: 09/962,305
Filed: Sep. 26, 2001

U.S. Applications:
(62) Division of application No. 09/737,551, filed on Dec. 18, 2000, now Pat. No. 6,334,724, which is a division of application No. 09/302,955, filed on Apr. 30, 1999, now Pat. No. 6,190,069, which is a continuation-in-part of application No. 08/450,356, filed on May 25, 1995, now Pat. No. 5,653,542, and a division of application No. 08/621,835, filed on Mar. 26, 1996, now Pat. No. 5,964,539.

(30) Foreign Application Priority Data

May 25, 1994 (JP) ..... 6-136328
Mar. 29, 1995 (JP) ..... 7-100061

(51) Int. Cl.
*B41J 29/02* (2006.01)

(52) U.S. Cl. ..... 400/693.1; 400/247
(58) Field of Classification Search ..... 400/693.1, 400/247
See application file for complete search history.

(56) References Cited

U.S. PATENT DOCUMENTS 4,261,260 A * 4/1981 Thomson et al. ..... 101/45
4,380,032 A 4/1983 Pfost
4,402,619 A 9/1983 Paque et al.
4,419,749 A * 12/1983 Nokihara et al. ..... 369/11
4,496,955 A 1/1985 Maeyama
4,557,617 A 12/1985 Richardson et al.
4,776,714 A 10/1988 Sugiura et al.
4,815,871 A 3/1989 McGourty et al.
4,815,875 A 3/1989 Richardson et al.
4,927,278 A 5/1990 Kuzuya et al.
4,930,913 A 6/1990 Basile
4,966,476 A 10/1990 Kuzuya et al.

(Continued)

FOREIGN PATENT DOCUMENTS

BX 24609-01 2/1994
CH 121073 2/1994
DE 4023784 A1 2/1991

(Continued)

*Primary Examiner*—Anthony H. Nguyen
(74) *Attorney, Agent, or Firm*—Oliff & Berridge, PLC

(57) ABSTRACT

A tape cassette is used in a printing device with a drive shaft. The tape cassette includes a cassette casing which houses a printing tape and defines a feed path through which the tape moves in a feeding direction. The cassette casing includes a head recess adapted to receive a print head of the printing device. The cassette casing forms a generally rectangular shape that is bounded by four corners, but also includes a recess for receiving the drive shaft adjacent a first corner of the four corner of the cassette casing downstream of, and spaced from, the head recess in the feed direction. The cassette casing defines a first positioning hole adjacent the drive shaft and a second positioning hole spaced from the drive shaft, the first and second positioning holes each communicating with a corresponding pin of the printing device to ensure a proper positioning of the cassette casing within the printing device. A detector surface is located on the cassette casing and is adapted to interact with an array of sensors on the printing device to identify at least one characteristic of the tape cassette. The detector surface is positioned at a second corner of the four corners of the cassette casing most distant from the first corner.

6 Claims, 25 Drawing Sheets

U.S. PATENT DOCUMENTS

| | | | |
|---|---|---|---|
| 5,009,531 | A | 4/1991 | Koike |
| D317,172 | S | 5/1991 | Miyamoto et al. |
| 5,017,942 | A | 5/1991 | Asakura et al. |
| 5,022,771 | A | 6/1991 | Paque |
| 5,056,940 | A | 10/1991 | Basile |
| 5,078,523 | A | 1/1992 | McGourty et al. |
| 5,120,147 | A | 6/1992 | Ozaki |
| 5,165,806 | A | 11/1992 | Collins |
| 5,188,469 | A | 2/1993 | Nagao et al. |
| 5,195,835 | A | 3/1993 | Collins |
| 5,232,297 | A | 8/1993 | Kitazawa |
| D342,275 | S | 12/1993 | Cooper |
| 5,277,503 | A | 1/1994 | Nagao |
| 5,302,034 | A | 4/1994 | Kitazawa |
| 5,336,003 | A | 8/1994 | Nagashima |
| 5,348,406 | A | 9/1994 | Yoshiaki et al. |
| 5,350,243 | A | 9/1994 | Ichinomiya et al. |
| 5,374,132 | A | 12/1994 | Kimura |
| 5,411,339 | A | 5/1995 | Bahrabadi et al. |
| 5,419,643 | A | 5/1995 | Matsuura |
| 5,419,648 | A | 5/1995 | Nagao et al. |
| D361,342 | S | 8/1995 | Hattori et al. |
| 5,443,319 | A | 8/1995 | Sugiura et al. |
| 5,447,378 | A | 9/1995 | Otsuka et al. |
| 5,454,650 | A | 10/1995 | Yamaguchi |
| 5,480,237 | A | 1/1996 | Tanahashi |
| 5,500,669 | A | 3/1996 | Yamashita et al. |
| 5,533,818 | A | 7/1996 | Bahrabadi |
| 5,536,092 | A | 7/1996 | Yamaguchi |
| 5,538,352 | A | 7/1996 | Sugiura |
| 5,595,447 | A | 1/1997 | Takayama et al. |
| 5,618,119 | A | 4/1997 | Misu et al. |
| 5,620,268 | A | 4/1997 | Yamaguchi et al. |
| 5,636,926 | A | 6/1997 | Yamaguchi |
| 5,653,542 | A | 8/1997 | Sugimoto et al. |
| 5,727,888 | A | 3/1998 | Sugimoto et al. |
| 5,771,803 | A | 6/1998 | Takami |
| 5,964,539 | A | 10/1999 | Yamaguchi et al. |
| 6,042,280 | A | 3/2000 | Yamaguchi et al. |

FOREIGN PATENT DOCUMENTS

| | | | |
|---|---|---|---|
| DE | M 9401507.4 | | 2/1994 |
| DE | 43 30 742 | A | 3/1994 |
| EP | 0 322 918 | A | 7/1989 |
| EP | 0 327 076 | A | 8/1989 |
| EP | 0 386 937 | A1 | 9/1990 |
| EP | 0 457 309 | A | 11/1991 |
| EP | A-475767 | | 3/1992 |
| EP | 0 487 312 | A | 5/1992 |
| EP | 0 555 954 | A | 9/1993 |
| EP | 0 555 957 | A | 9/1993 |
| EP | 0 588 333 | A | 9/1993 |
| EP | A-580438 | | 1/1994 |
| EP | A-652110 | | 5/1995 |
| EP | 0 769 385 | A1 | 10/1995 |
| FR | 940681 | | 2/1994 |
| GB | 2037151 | | 8/1994 |
| JP | 62-189187 | | 8/1987 |
| JP | 63-222883 | | 9/1988 |
| JP | 1-101180 | | 4/1989 |
| JP | 2-106555 | | 4/1990 |
| JP | 5-84994 | | 6/1993 |

* cited by examiner

121

| | |
|---|---|
| A | RED |
| B | RED |
| SP | |
| C | GREEN |
| D | GREEN |
| E | GREEN |
| SP | |
| F | BLACK |
| G | BLACK |
| | |

TAPE-SHAPED LABEL PRINTING DEVICE

Matter enclosed in heavy brackets [ ] appears in the original patent but forms no part of this reissue specification; matter printed in italics indicates the additions made by reissue.

*More than one reissue application has been filed for reissue of U.S. Pat. No. 6,709,179. In particular, eight applications for reissue of U.S. Pat. No. 6,709,179 have been filed: the present reissue application, filed May 10, 2005; Reissue application Ser. No. 11/599,635, filed Nov. 15, 2006; Reissue application Ser. No. 11/599,636, filed Nov. 15, 2006; Reissue application Ser. No. 11/599,637, filed Nov. 15, 2006; Reissue application Ser. No. 11/599,638, filed Nov. 15, 2006; Reissue application Ser. No. 11/980,692, filed Oct. 31, 2007; Reissue application Ser. No. 11/980,693, filed Oct. 31, 2007; and Reissue application Ser. No. 11/980,699, filed Oct. 31, 2007.*

This application is a division of Ser. No. 09/737,551 file date Dec. 18, 2000 now U.S. Pat. No. 6,334,724, which is a division of Ser. No. 09/302,955 file date Apr. 30, 1999 now U.S. Pat. No. 6,190,069, which is a CIP of Ser. No. 08/450,356 file date May 25, 1995 now U.S. Pat. No. 5,653,542 and a division of Ser. No. 08/621,835 file date Mar. 26, 1996 now U.S. Pat. No. 5,964,539.

BACKGROUND OF THE INVENTION

The present invention relates to a tape-shaped label printing device, and more particularly, to a tape-shaped label printing device capable of setting accurate print start position so as to perform several times of printings on an identical region of a tape printing medium by rewinding the tape and repeatedly performing printing.

One conventional tape-shaped label printing device is described in a commonly assigned U.S. Pat. No. 5,232,297 in which characters and marks such as alphabetic characters and symbols are printed on a tape printing medium and a resultant printed tape is suitable for making labels to adhere to file tabs. This tape-shaped label printing device includes a keyboard, a display, and a printing mechanism of the thermal printing type, and is configured to print characters, marks, and the like in a variety of font styles and sizes on a printing tape medium of widths such as 6, 9, 12, 18, and 24 mm.

Further, in the conventional label printing device, a tape cutting mechanisms is provided at a position downstream a thermal head in a tape feeding direction. Further, a length of a front margin and a rear margin can be set. After starting printing operation while feeding the tape in the tape feeding direction, if a distance between a tape cutting position of the tape cutting mechanism and a print start position becomes equal to a length of the front margin, the tape feeding is temporarily stopped and the tape is cut, and thereafter, the subsequent printing operation is performed.

Attempt was made on a conventional tape-shaped label printing device so as to be able not only to feed the printing tape, but also to rewind the printing tape. For example, after printing characters, symbols, and the like on the printing tape, the tape can be rewound to the print start position or a print start point of origin, and a second array of characters, symbols, and the like can be printed over the first printing area. In this way, a synthesized characters, or characters decorated with designs can be produced in the tape-shaped label.

Further, the tape-shaped labels printed with character arrays are not limited to use on file tabs. These labels are also appropriate for sticking on cassettes and their cases, or video tapes and their cases, for example. In such a case, multiple colored character arrays may be intended in accordance with recorded data and kind by repeatedly performing tape rewinding and tape printing process.

The inventors of the present application conceived the idea to provide a plurality of ribbon cassettes, separate from the tape cassette, with ink ribbons of not only black, but a plurality of colors such as red, green, and blue. Each of the ribbon cassettes is detachably mounted to the tape cassette, and the printing is made by the desired colors. A color range setting process is performed with respect to the input text data so as to make correspondence with the selected character array of the input text data with the color which has been set. The ribbon cassettes having the same ribbon color as the set printing colors are exchanged in sequence during the printing process.

During first printing operation with first ribbon cassette for printing an image with the first color, the tape is cut to obtain the predetermined amount of front margin. In the second and subsequent time of printing, the printing tape is rewound by a length corresponding to the feeding length of the tape in the preceding printing. In this way, can be produced a label printed with a synthesized characters, characters with colorful designs and characters with multiple colors.

In order to produce a label printed with the synthesized characters, patterns or characters with multiple colors, the identical region of the tape is repeatedly subjected to printing. Further, in the first printing operation, tape cutting is performed to obtain a preset front margin length. Therefore, in the second and subsequent time of printing operation, the printing tape must be rewound at high speed by a length corresponding to the tape feed amount in the precedent first printing operation. During rewinding operation, accurate rewinding amount may not be obtained due to the slippage between a platen roller and the printing tape. Further, the printing operation begins immediately after completion of the rewinding operation. As a result, print start position may not be accurate due to the backlash of a plurality of gears which constitutes the tape transfer mechanism.

SUMMARY OF THE INVENTION

It is therefore, an object of the present invention to provide a tape-shaped label printing device capable of accurately setting a print start point of origin in each printing in case the printing tape must be rewound at every printing so as to perform repeated printing by several times with respect to an identical region of the printing tape, and also capable of providing an accurate front margin length.

Another object of the present invention is to provide such device in which the printing tape can be cut while providing a present front margin length in a case where repeated printing are performed at the identical area of the printing tape.

These and other objects of the present invention will be attained by providing a tape-shaped label printing device for printing an image on a tape printing medium comprising a tape transfer mechanism, printing means, control means, tape detection means, and setting means. The tape transfer mechanism is adapted for alternatively transferring the tape printing medium in a tape feeding direction or a tape rewinding direction. The tape transfer mechanism provides a tape transfer passage having a downstream end. The printing means has a print head and is disposed at the tape transfer passage for printing the image onto the tape printing medium. The control means is adapted for controlling a printing process. The tape detection means is adapted for detecting the tape at a position nearby the downstream end of the tape transfer passage. The setting means is adapted for setting a particular tape portion as a point of origin for starting a printing operation thereat. The particular tape portion is a portion in confrontation with the print head when a predetermines position of the tape is detected by the tape detection means.

In another aspect of the present invention, there is provided a tape-shaped label printing device for printing an image on a tape printing medium comprising a tape transfer mechanism, printing means, a tape cutting mechanism, setting means, and control means. The tape transfer mechanism is adapted for alternatively transferring the tape printing medium in a tape feeding direction or a tape rewinding direction. The tape transfer mechanism provides a tape transfer passage having a downstream end portion. The printing means has a print head defining a printing position. The printing means is disposed at the tape transfer passage for printing the image onto the tape printing medium. The tape cutting mechanism is adapted for cutting the tape printing medium at a position nearby the downstream end of the tape transfer passage. The setting means is adapted for setting a cut position of the tape printing medium at a position downstream of the printing position. The cut position becomes a leading end of a front margin. The control means is adapted for controlling the tape transfer mechanism at an initial tape feeding period of a final time printing of a plurality of times of printing on an identical portion of the tape printing medium, so that a transfer of the tape printing medium in the feeding direction is stopped when the cut position imparted on the tape printing medium by the setting means reaches the tape cutting mechanism.

BRIEF DESCRIPTION OF THE DRAWINGS

In the drawings;

FIG. 26(c) is an explanatory diagram showing the point at which the tape has been further supplied by the distance of the idle feeding;

DETAILED DESCRIPTION OF THE PREFERRED EMBODIMENTS

A tape-shaped label printing device according to one embodiment of the present invention will be described with reference to FIGS. 1 through 29. The device is particularly available for printing characters, symbols, and the like in a plurality of colors on a printing tape which is a printing medium by exchanging a plurality of ribbon cassettes each with a different ribbon color.

Figure 1:
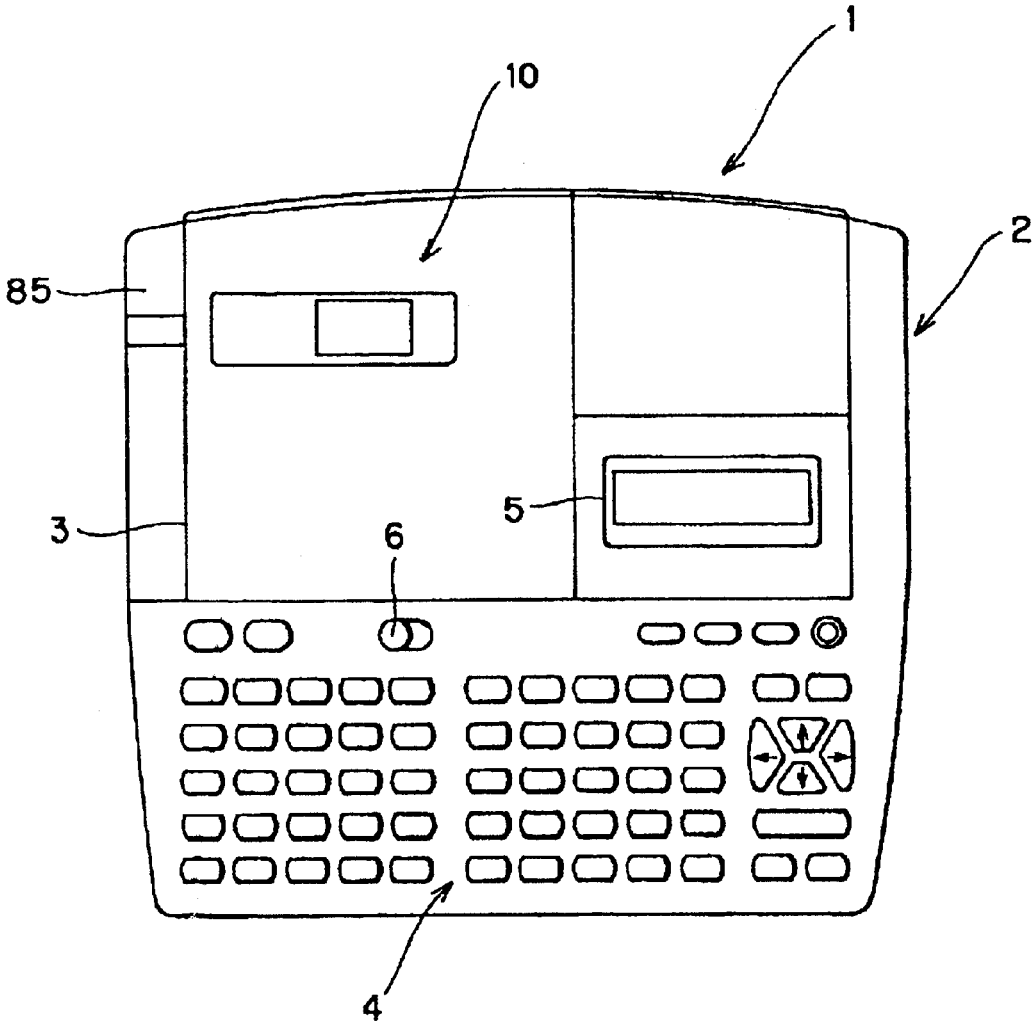
FIG. 1 is a plan view of a tape-shaped label printing device.

As shown in FIG. 1, a keyboard 4 is arranged on the front portion of the main cover 2 of a tape-shaped label printing device 1. The keyboard 4 is provided with various function keys and includes keys such as character keys, symbol keys, and numeric keys. Immediately behind the keyboard 4, a liquid crystal display 5 capable of displaying the input characters, symbols, and the like is provided. A thermal printing mechanism 10 containing a thermal head 12 is provided within the main cover 2. The thermal head 12 is provided at a position corresponding to a cassette cover 3, which is opened and closed to allow exchanging of ribbon cassettes 30. A slide knob 6 is provided slidably for opening the cassette cover 3. A cutting knob 85 is also provided, which is pressed down for manually cutting a printing tape 22 which has been printed on.

Next, a tape cassette 20 will be described with reference to FIGS. 2 through 7. The tape cassette 20 is detachably mounted on the thermal printing mechanism 10 which will be described later with reference to FIGS. 2 through 8.

A tape spool 23 is rotatably provided on the inside of a tape case 21 of the tape cassette 20. A printing tape 22 formed of a thin film is wound around the tape spool 23. The printing tape 22 supplied from the tape spool 23 is moved in the tape feeding direction by a tape feeding roller 24 while being guided in a curved passage by a plurality of guides, passing directly in front of the thermal head 12, and discharged out of the tape cassette 20.

Figure 7:
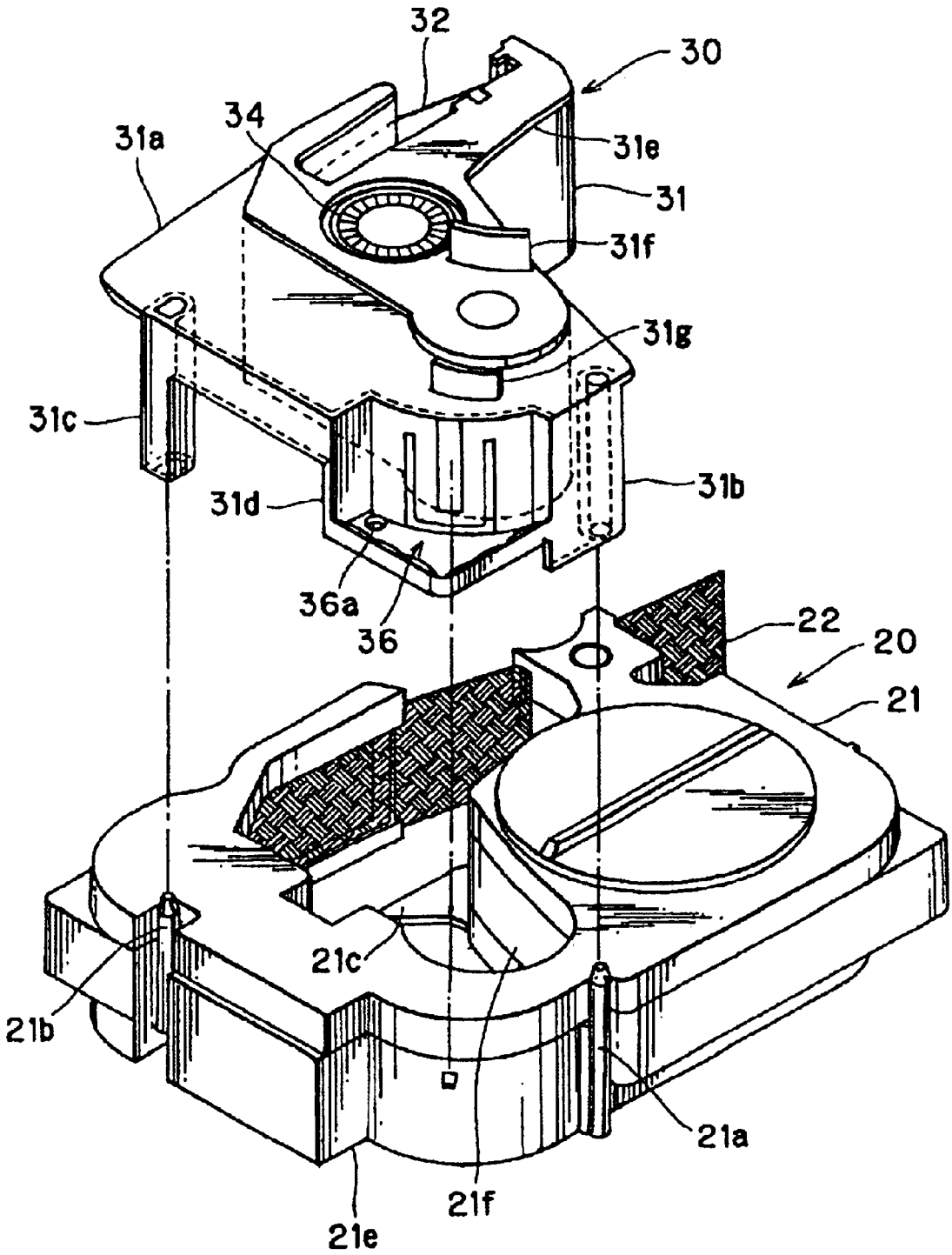
FIG. 7 is a rear perspective view of the ribbon cassette and tape cassette.

As shown in FIG. 7, a pair of guide shafts 21a and 21b are provided at positions spaced away from each other for supporting a ribbon cassette 30. Each lower end portion of the guide shaft 21a, 21b is provided integrally with an outer peripheral wall of the tape cassette 20. The ribbon cassette 30 is slidably movable in a vertical direction along the guide shafts 21a, 21b and is supported thereby for exchanging the ribbon cassette 30 with a new ribbon cassette. Further, a pair of lower end walls 21c and 21d (FIG. 5) are formed on the tape case 21 for supporting the lower-surface of the ribbon cassette 30. A notch 21e is formed at a corner portion of the tape case 21.

Next, the ribbon cassette 30, which is removably mounted on the tape cassette 20, will be described with reference to FIGS. 2 through 8. The ribbon cassette 30 includes a ribbon case 31 which is integrally provided with an upper wall 31a extending horizontally and adapted to contact with the top wall of the tape case 21. A pair of engaging feet 31b and 31c, each having a through-hole running through its entire length, extend integrally from the lower surface of the upper wall 31a and at edge portions thereof to fit around the pair of guide shafts 21a and 21b of the tape case 21. A vertical wall 31d is integrally suspended from the upper wall 31a. The vertical wall 31d is in contact with the notch 21e of the tape case 21. A head accommodating portion 37 (FIG. 6) is formed on the ribbon cassette 30 to accommodate the thermal head 12, which is inserted from below and-passed through the tape cassette 20 when the tape cassette is mounted on the printing device 1.

In addition, the inner portion of the ribbon case 31 is rotatably provided with a ribbon spool 33 around which the ink ribbon 32 is wound, and a take-up spool 34 for taking up the ink ribbon 32. Through an ink ribbon passage provided in; the ribbon cartridge 30, the ink ribbon 32 winding over the ribbon spool 33 extends in parallel with and in the vicinity of the printing tape 22 when the ink ribbon 32 is placed against the thermal head 12, and the ink ribbon is bent in an approximate acute angle at a separation portion 35a of a separation member 35 provided integrally with the ribbon case 31. Thus the ink ribbon 32 is separated from the printing tape 22 and taken up by the ribbon take-up spool 34. The separation member 35 of the ribbon case 31 is positioned on the downstream side of the thermal head 12 in the tape feeding direction. A lid 31e is provided on the ribbon case 31 to support the ribbon spool 33, the take-up spool 34, and the separation member 35, etc.

A ribbon cassette accommodating portion 21f for accommodating the ribbon cassette 30 is formed in the tape case 21 as shown in FIG. 7. Tabs 31f and 31g are provided on the upper surface of the lid 31e and upper wall 31a of the ribbon case 31, respectively. When printing, the tape case 21 is first mounted in a recessed portion (not shown) formed in the main cover 2, and then, the ribbon cassette 30 having the desired color of ink ribbon 32 can be mounted in the ribbon cassette accommodating portion 21f of the tape case 21. In mounting the ribbon cassette 30 in the ribbon cassette accommodating portion 21f, while grasping each of the tabs 31f and 31g with two fingers, the engaging legs 31b and 31c are fitted around their corresponding guide shafts 21a and 21b via the holes running through the engaging legs 31b and 31c, and the ribbon cassette 30 is moved downward so that it is received in the ribbon cassette accommodating portion 21f. At this time, the upper wall 31a of the ribbon case 31 is resting on the top surface of the tape cassette 20, while the-lower end of the ribbon cassette 30 is brought into abutment with the pair of lower end walls 21c and 21d of the tape case 21 from above, and the ribbon cassette 30 is held in a desirable position relative to the tape case 21.

With colors such as red, green, yellow, and black and ribbon widths such as 12, 18, 24, and 32 mm, a plurality of varieties of ink ribbons 32 have been prepared for the ribbon cassette 30. A group of detection holes 36 made up of a maximum of six detection holes 36a (the ribbon cassette of FIG. 6 only shows one detection hole 36a for simplicity) are formed on a lower horizontal end portion of the vertical wall 31d on the ribbon case 31 for allowing detection of any one of these plurality of varieties of ribbon cassettes 30.

Next, a tape/ribbon transfer mechanism 40 will be described with reference to FIG. 9. The tape/ribbon transfer mechanism 40 can move the printing tape 22 and the ink ribbon 32 in the feeding direction, i.e., the printing direction, and in the rewinding direction, i.e., the direction-opposite to the printing direction.

Supported rotatably on the main frame 11 are a tape take-up cam 41 engageable with the center portion of the tape spool 23, a ribbon take-up can 42 engageable with the center portion of the ribbon take-up spool 34, and a tape drive cam 43 engageable with the center portion of the tape feed roller 24. The main frame 11 is provided with the thermal head 12, and also with a group of ribbon detection switches 103, including detection switches No. 1 through No. 6, for detecting the existence of the six detection holes 36a in the previously mentioned group of detection holes 36. A ribbon detection signal RS is adapted to be output according to the combination of switch signals from these six detection switches. The cassette detection means is thus constructed by the group of ribbon detection switches 103 and the group of detection holes 36.

Further, a tape drive motor 44 such as a stepper motor is installed on the right front end portion of the main frame 11. Gears 46 through 53, each rotatably supported on the main frame 11 are interlocked sequentially with a drive gear 45 of the tape drive motor 44. A gear 55 and a tape drive gear 54 coupled to the tape drive cam 43 are meshedly engaged with the gear 53. Among these gears, gears 48 and 49 are provided integrally and are fixed to the lower end-portion of the ribbon take-up cam 42. Gears 50 and 51 are provided integrally. Additionally, tape take-up gear 52 is fixed to the lower end portion of the tape take-up cam 41. Thus, the rotation of the tape drive motor 44 is transmitted to the tape drive cam 43 fixed to the tape drive gear 54 via the gears 45 through 54. Accordingly, the printing tape 22 is fed in the feeding direction by the rotation of the tape feed roller 24.

A swing lever 56 is provided. The swing lever 56 has a base portion supported in a space between the gears 50 and 51 integral therewith., An appropriate amount of frictional resistance is provided between the swing lever 56 and the two gears. The swing lever 56 is rotatably provided with a planet gear 57 continuously engaged with the gear 51.

The gear 53 has a rotation shaft 58 to which-a base end portion of a cut-restricting lever 84 is urgedly supported.

That is, the cut-restricting lever 84 supports thereon a torsion spring 59, and one end of the torsion spring and the base end of the lever 84 interpose therebetween the shaft 58, so that the base end of the cut-restricting lever 84 is urgedly pressed against the shaft 58 by the biasing force of the torsion spring 59.

Figure 9:
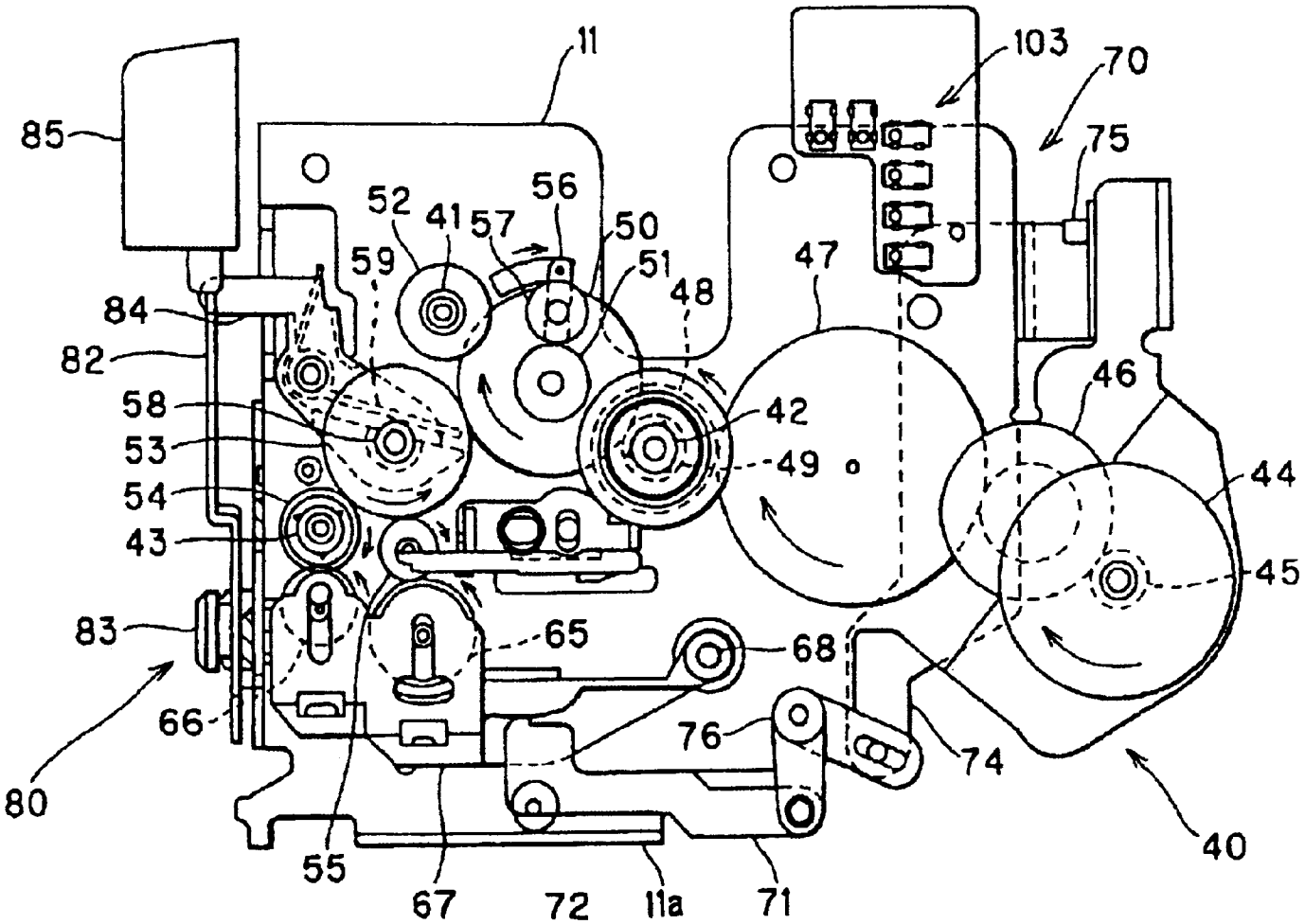
FIG. 9 is a plan view of a drive system of the thermal printing mechanism in the printing state.
Figure 10:
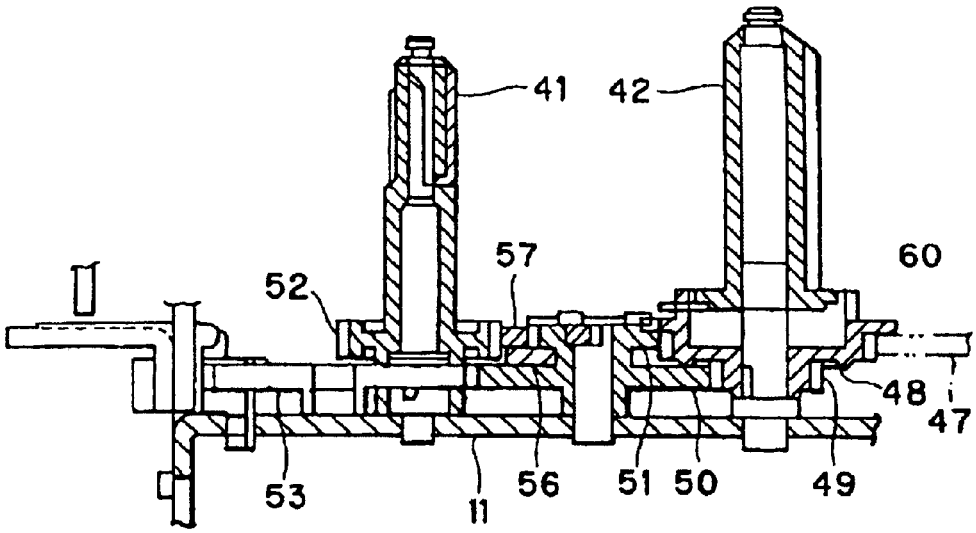
FIG. 10 is a vertical cross-sectional front view of an essential portions of FIG. 9 showing gear engaging relation.

As shown in FIG. 9, when the tape drive motor 44 is driven in a clockwise direction for normal printing operation, the gear 50 rotates in a clockwise direction. In this case, the swing lever 56 is pivoted in a clockwise direction about an axis of the gear 51 because of the frictional force in association with the gears 50 and 51. Consequently, the planet gear 57 is disengaged from the tape take-up gear 52 to render the tape take-up cam 41 free. Accordingly, the printing tape 22 wound over the tape spool 23 can be paid out (no take-up force is imparted to the take-up cam 41). At the same time, the gear 53 is rotated in a counterclockwise direction, so that the cut restricting lever 84 is pivoted about an axis of the shaft 53 in a counterclockwise direction. Consequently, the end portion of the cut restricting lever 84 is brought into a position immediately below a cutting lever 82 described later, thus restricting cutting operations. At the same time, because of the rotation in a counterclockwise direction of the ribbon drive gear 48, the ribbon take-up cam 42 is also rotated in the counterclockwise direction, via a clutch spring 60. Therefore, the ink ribbon 32 is taken up by the ribbon take-up spool 34.

A roller holder 67 for rotatably supporting a rubber platen roller 65 and a rubber tape feeding sub-roller 66 is pivotably supported on the main frame 11 by a pivot shaft 68. A release lever 71 is provided movably in the leftward and rightward direction in interlocking relation to the opening and closing motion of the cassette cover 3. The release lever 71 changes its position between a printing position shown in FIG. 9 and a release position shown in FIG. 11. The roller holder 67 is normally biased toward its release position by a spring (not shown). A wheel roller 72 rotatably attached to the release lever 71 is in contact with an upstanding wall 11a of the main frame 11. At the same time, a free end of the release lever 71 is in contact with the roller holder 67 from the rear side.

Figure 2:
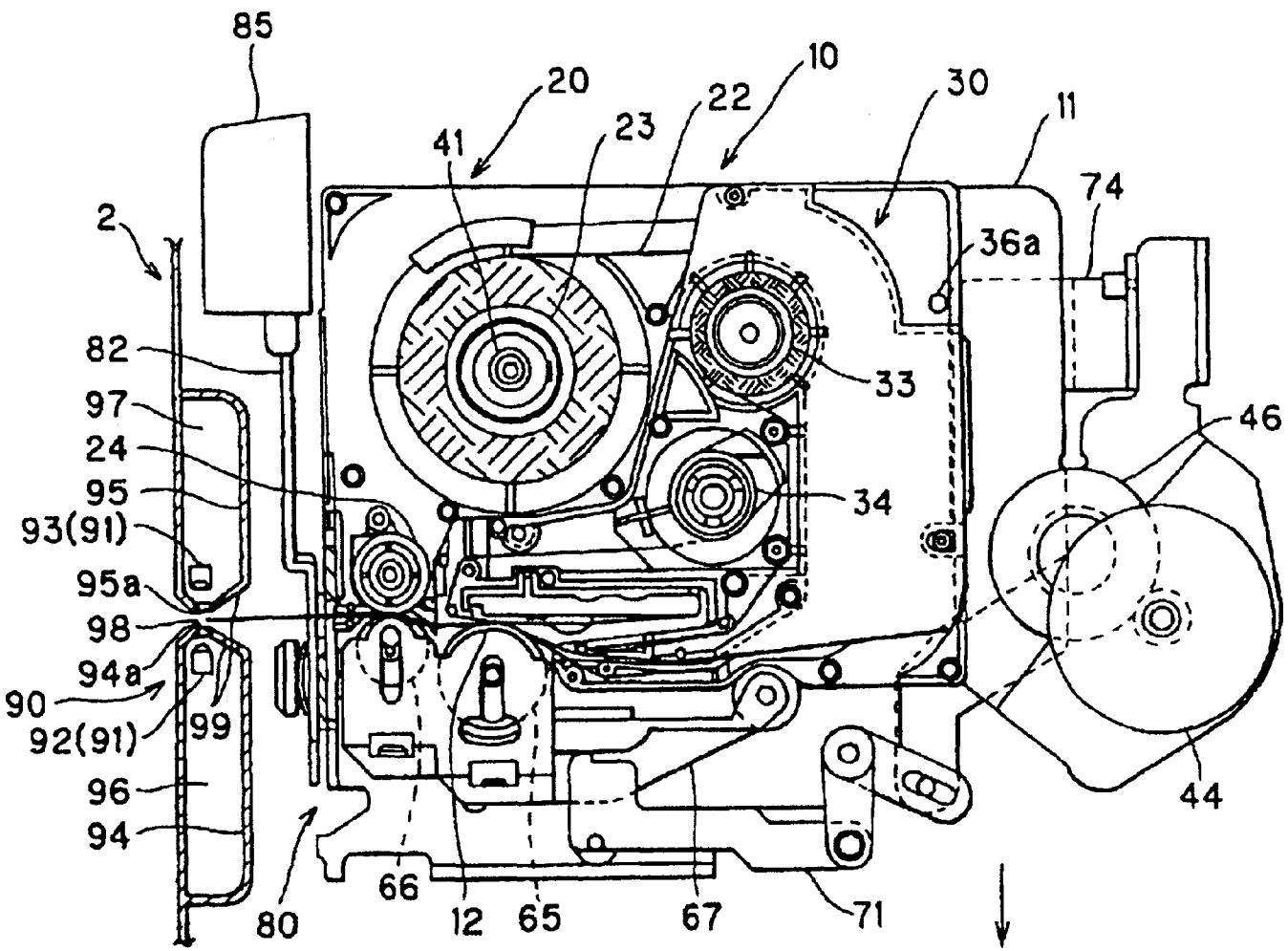
FIG. 2 is a plan view of a thermal printing mechanism in the printing state.
Figure 11:
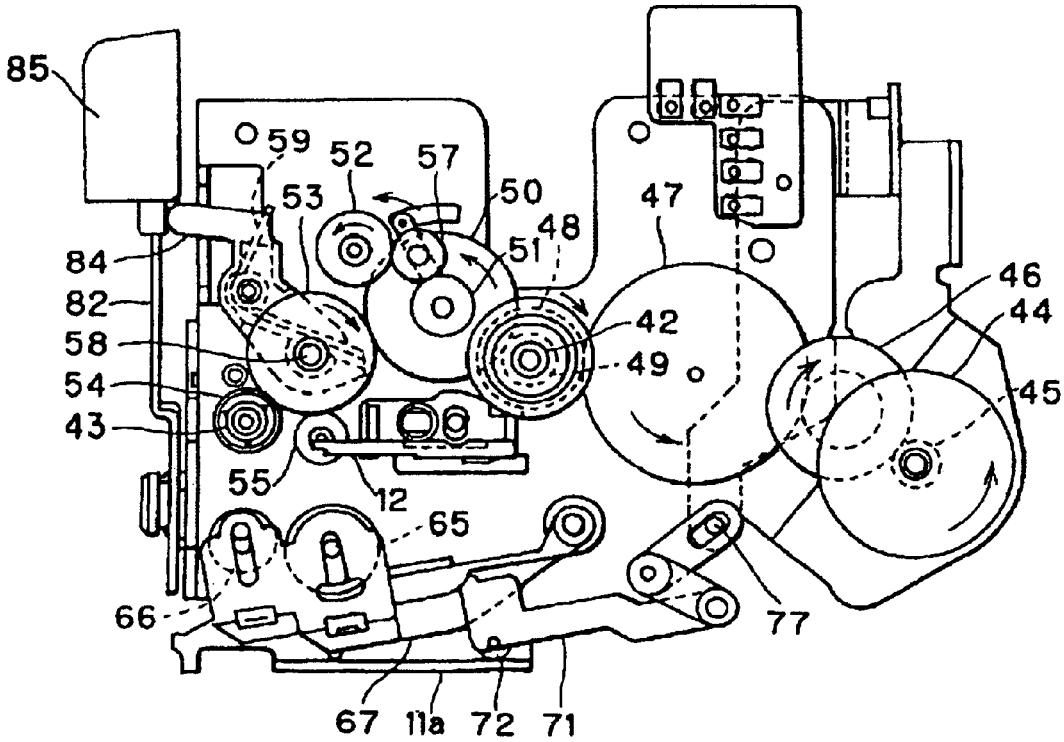
FIG. 11 is a plan view of the drive system in the tape rewinding state of the thermal printing mechanism.

Therefore, when the release lever 71 is moved in the left direction from a release position shown in FIG. 11 to an operating position shown in FIG. 9, the left end of the release lever 71 is wedged between the roller holder 67 and the upstanding wall 11a, so that the roller holder 67 is changed from its release position to its printing position. At this time, the platen roller 65 presses against the thermal head 12 through the printing tape 22 and the ink ribbon 32, and the tape feeding sub-roller 66 presses against the tape feeding roller 24 through the printing tape 22 as also shown in FIG. 2.

When the roller holder 67 is changed to the printing position, a platen gear (not shown) fixed to the lower end portion of the platen roller 65 is brought into meshing engagement with the gear 55, and a sub-roller gear (also not-shown) fixed to the lower end portion of the tape feeding sub-roller 66 is brought into meshing engagement with the tape drive gear 54.

Next, a head release mechanism 70 will be described with reference to FIG. 9 and FIGS. 11 through 13. The head release mechanism is adapted to move the platen roller 65 and the sub-roller 66 away from the thermal head 12 and the tape feed roller 24 so as to allow reversal or rewinding movement of the tape 22. To this effect the head release mechanism moves the roller holder 67 to its release position with respect to the thermal head 12 by moving the release lever 71 rightwardly in accordance with the opening movement of the cassette cover 3.

Figure 12:
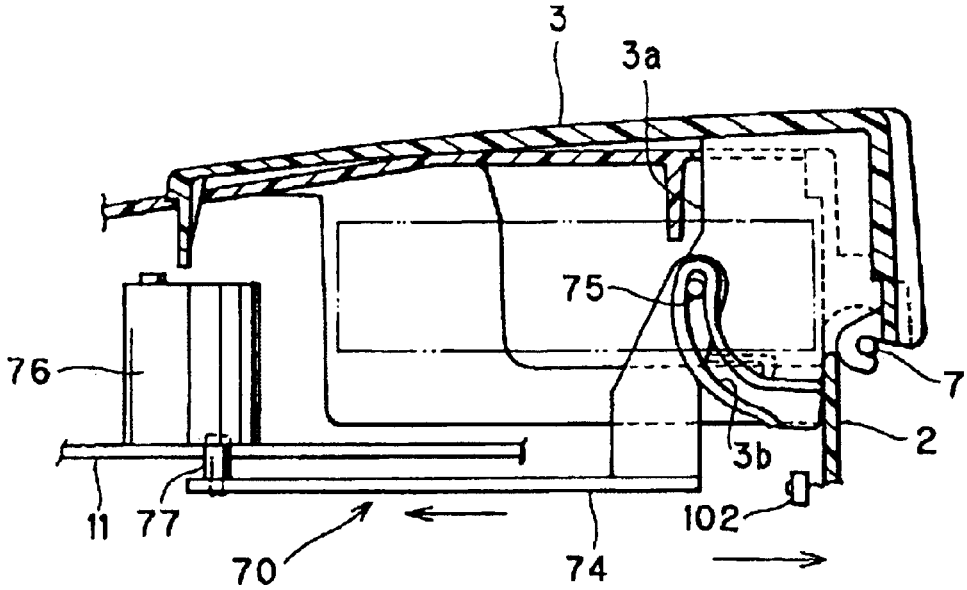
FIG. 12 is a vertical cross-sectional side view of an essential portion when the cassette cover is closed.
Figure 13:
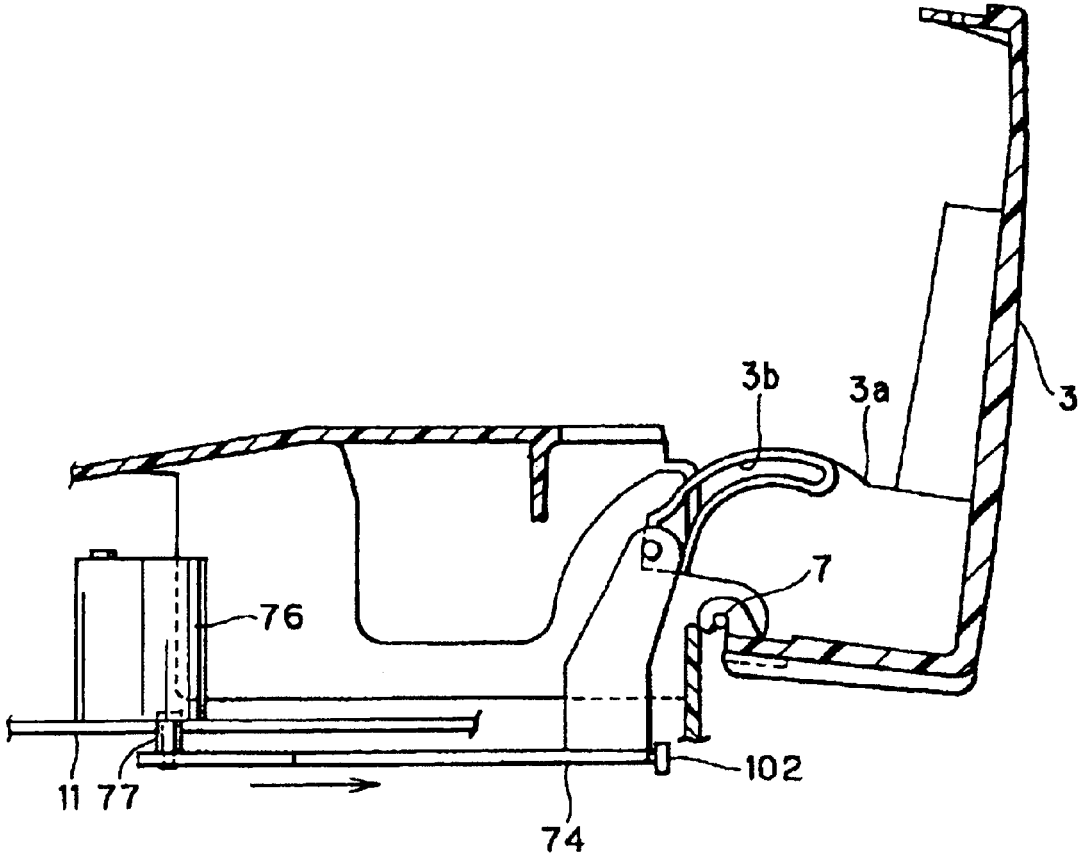
FIG. 13 is a vertical cross-sectional side view of the essential portions when the cassette cover is open.

As shown in FIGS. 12 and 13, the rear portion of the cassette cover 3 is supported in a plurality of places by the pivotal pin 7 attached on the main cover 2, so that the cassette cover 3 can open and close. A curved, grooved cam 3b is formed on the right side wall 3a of the cassette cover 3. An operation plate 74 is positioned on the right, underside of the main frame 11, and an engaging pin 75 engageable with the grooved cam 3b is fixed to the rear end portion of the operation plate 74. The right end portion of the release lever 71 is pivotally supported on one arm of a forked lever 76. The forked lever 76 has the other arm connected to the operation plate 74 via a pin 77 fixed to the front end portion of the operation plate 74. A cover open and close detection switch 102 is provided at a position in confrontation with the operation plate 74.

In a state where the cassette cover 3 is closed as shown in FIG. 12, in other words, in a state where the roller holder 67 is in the printing position shown in FIG. 9, if the cassette cover 3 is then opened as shown in FIG. 13, the engaging pin 75 engaged with the grooved cam 3b is moved rearwardly by the movement of this grooved cam 3b. Therefore, the operation plate 74 is moved rearwardly, and the forked lever 76 is pivoted in the counterclockwise direction. As a result, the roller holder 67 is moved rightwardly so that the roller holder 67 is changed to the release position. When the operation plate 74 is moved rearwardly, a cover open and close signal VS of "H" level is output from the cover open and close detection switch 102.

Further, when the cassette cover 3 is in the open position shown in FIG. 13, in other words, when the roller holder 67 is in the release position shown in FIG. 11, and the cassette cover 3 is then closed, as shown in FIG. 12, the engaging pin 75 is moved frontwardly by the movement of the grooved cam 3b. Therefore, the operation plate 74 is moved frontwardly, and the forked lever 76 is pivoted in the clockwise direction from the position shown in FIG. 11. Thus, the roller holder 67 is changed to the printing position, or non-release condition, in response to the movement of the release lever 71 in the leftward direction.

As shown in FIGS. 2 and 9, for performing printing operation, the tape cassette 20 is first mounted on the thermal printing mechanism 10. Then, the ribbon cassette 30 is mounted on the tape cassette 20. When the cassette cover 3 is closed, the roller holder 67 is shifted to the printing position. From this position, when the tape drive motor 44 is driven in its normal printing direction, i.e., in clockwise direction, each of the gears 45 through 55 is driven to rotate in its prescribed direction. The platen roller 65 and the tape feeding sub-roller 66 are each rotated in the counterclockwise direction. Further, because the tape feeding sub-roller 66 and the tape feeding roller 24 are in synchronous rotation, the tape passes by a tape cutting mechanism 80 and a tape detection unit 90, those described later, and is discharged outside, while the printing tape 22 is being printed on by the thermal head 12. During this time, the tape take-up cam 41 is free, and, therefore, the printing tape wound over the tape spool 23 is continually supplied in the tape feeding direction with no resistance. At the same time, and at the same pace as the printing tape 22, the ink ribbon 32 is supplied from the ribbon spool 33 by the rotating motion of the platen roller 65. The ink ribbon 32 is then taken up by the ribbon take-up spool 34 engaged with the ribbon take-up cam 42 which is rotated by the ribbon take-up gear 48.

After the-printing with the first color is completed and the second color is to be printed, the cassette cover 3 is released.

Figure 3:
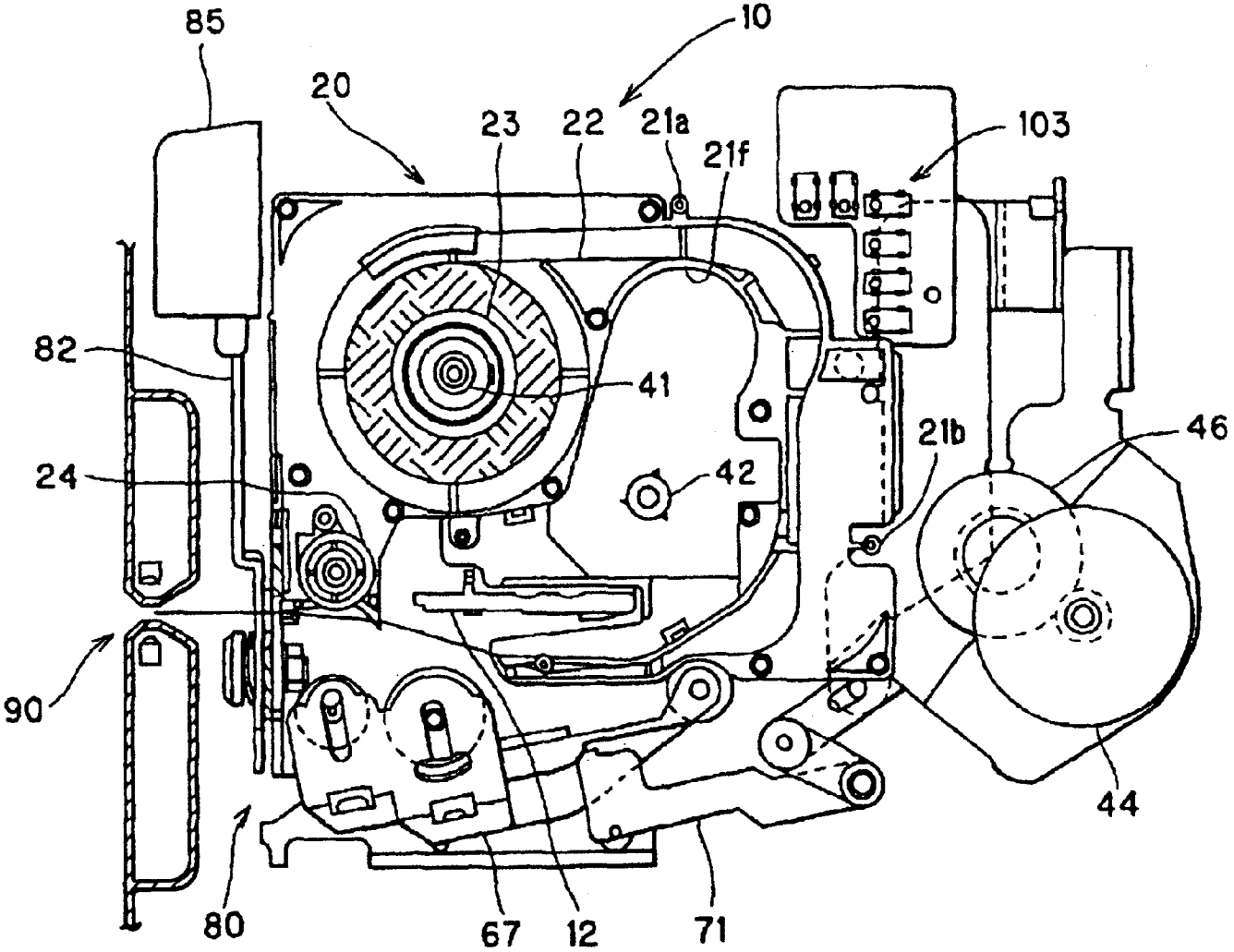
FIG. 3 is a plan view of the thermal printing mechanism in the tape rewinding state.
Figure 4:
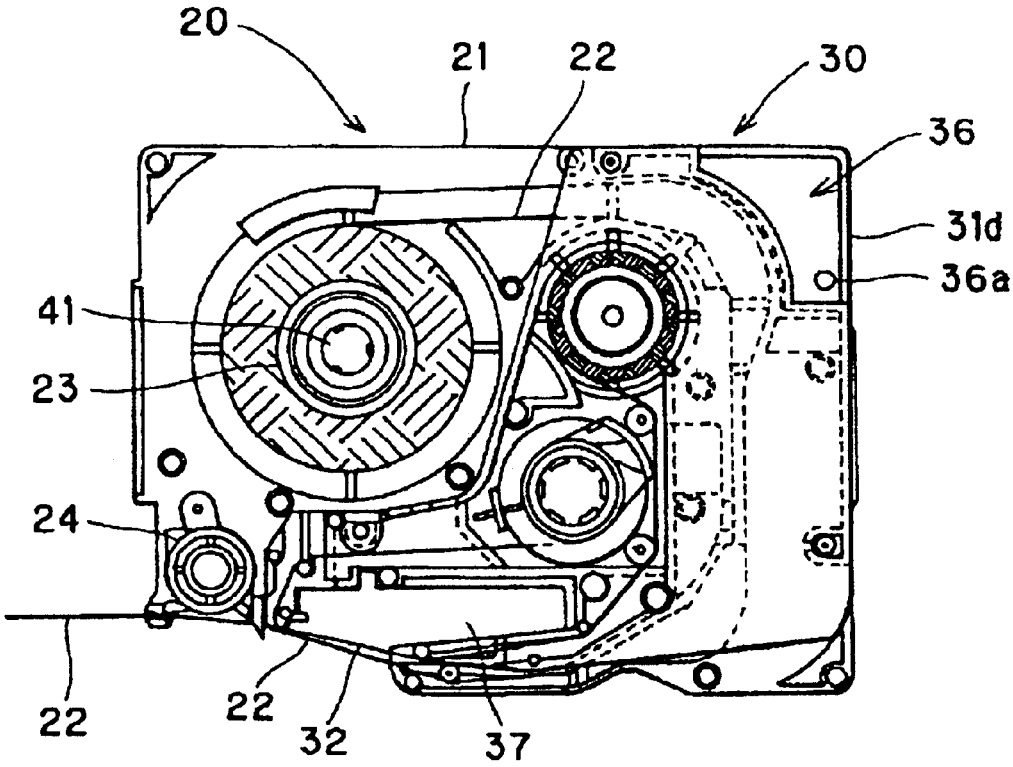
FIG. 4 is a plan view of a tape cassette mounted with a ribbon cassette.
Figure 5:
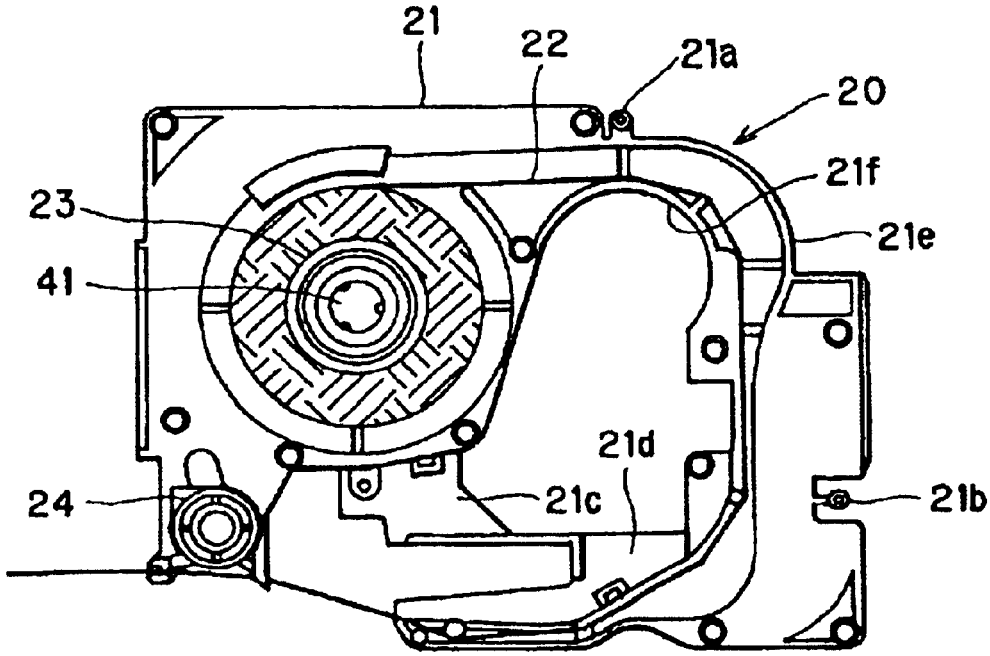
FIG. 5 is a plan view of the tape cassette.
Figure 6:
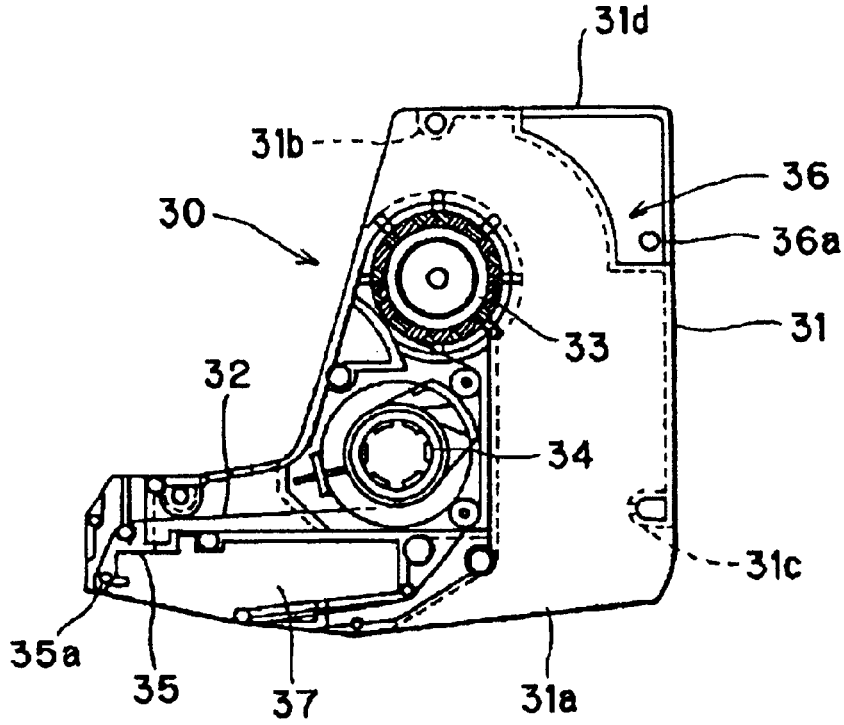
FIG. 6 is a plan view showing an internal arrangement of the ribbon cassette.
Figure 8:
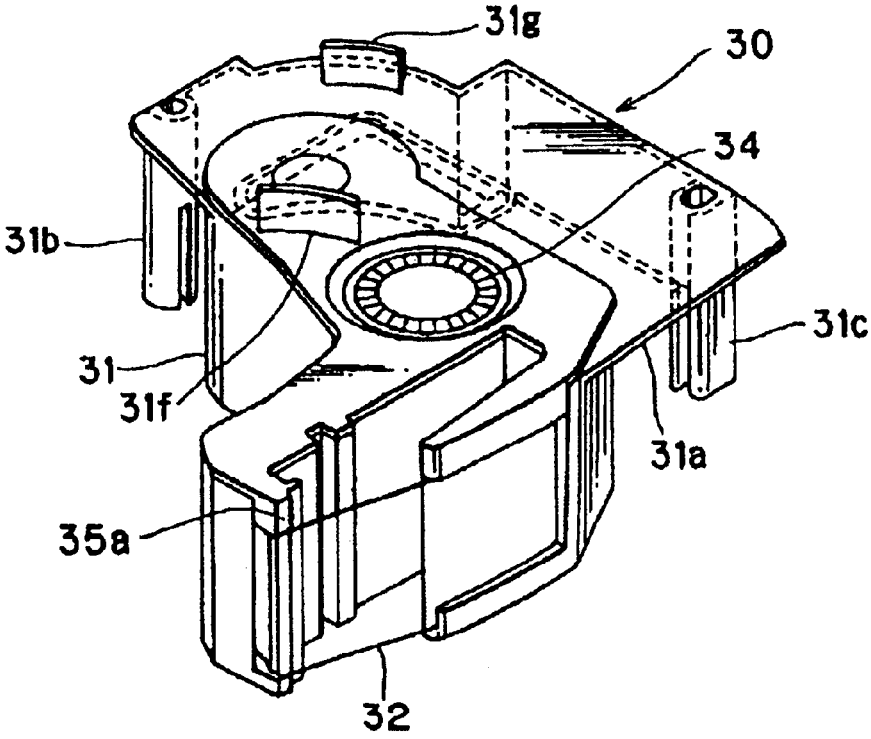
FIG. 8 is a perspective view of the ribbon cassette.

In a state where the ribbon cassette 30 is removed from the tape cassette 20, the roller holder 67 is changed to the release position by the head release mechanism 70. Then, when the tape drive motor 44 is driven to rotate in the counterclockwise direction, (the tape rewinding direction), each of the gears 45 through 55 is driven to rotate in its prescribed direction, as shown in FIGS. 3 and 11. As a result of the gear 50 rotating in the counterclockwise direction, the swinging lever 56 is also pivoted in the counterclockwise direction to bring the planet gear 57 into meshing engagement with the tape take-up gear 52. Accordingly, the tape take-up cam 41 is rotated in the counterclockwise direction. Thus, the printing tape 22 that has been printed once is taken up by the tape spool 23. At this phase, the ribbon take-up gear 48 is driven in the clockwise direction. However, the ribbon cassette 30 has already been removed, and therefore, inadvertent reverse feeding of the ink ribbon 32 does not occur.

Figure 14:
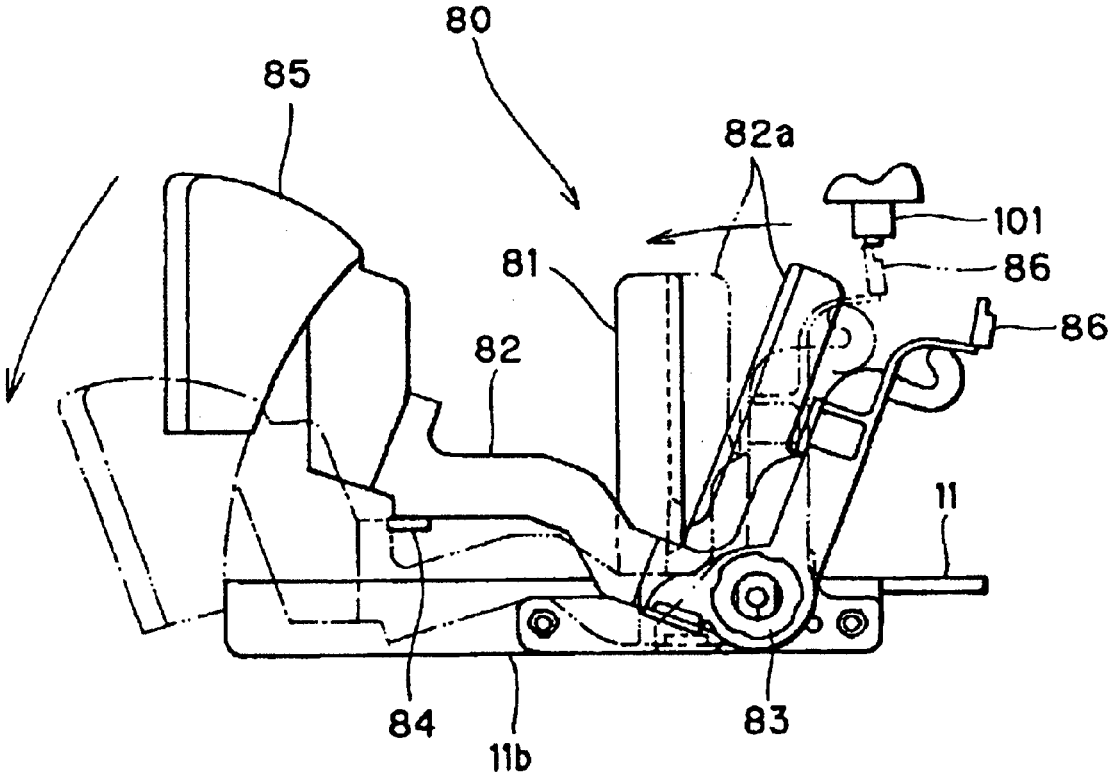
FIG. 14 is a side view of a thermal printing mechanism, showing the tape cutting mechanism.

Next, a tape cutting mechanism 80 for cutting the printing tape 22 that has been printed will be described with reference to FIG. 9, FIG. 14 and FIG. 15.

The main frame 11 has a left end wall 11b which is provided by partially bending downwardly the left end portion of the frame 11, and a lower end of a fixed blade 81 is fixed to the left end wall 11b. A cutting lever 82, which, from the side view, looks like an abbreviated L shape, has a base end portion pivotally supported by a screw 83 to the left end wall 11b. A movable blade 82a is formed on the cutting lever 82. As shown in FIG. 9, during the printing process, gear 53 rotates in the counterclockwise direction, moving the end portion of the cut restricting lever 84 to the under side of the cutting lever 82 and, thus, restricting the cutting operation.

Figure 15:
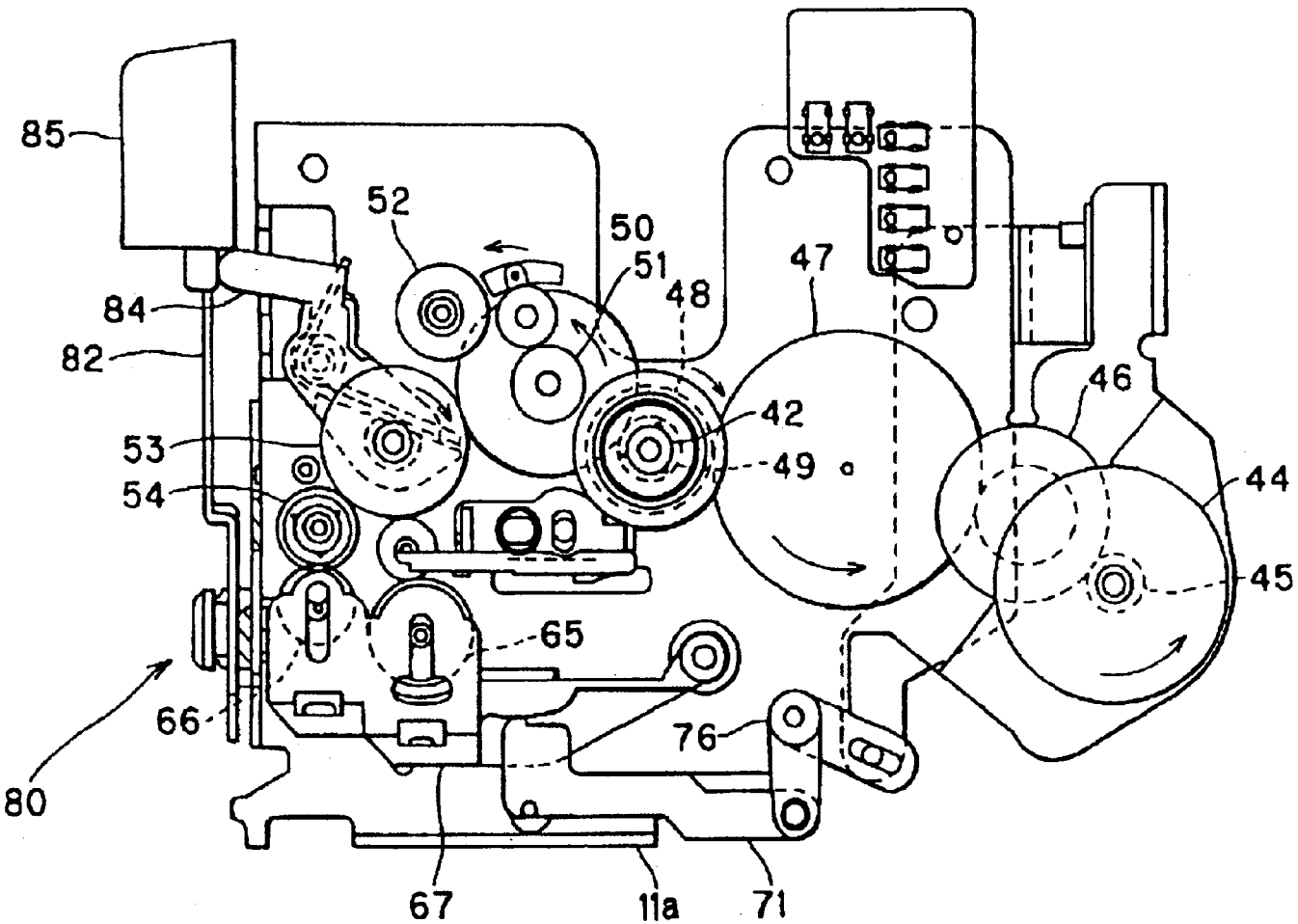
FIG. 15 is a plan view of the drive system of the thermal printing mechanism in the tape cutting permission state.

However, when printing is completed and the tape drive motor 44 is rotated only slightly in the rewinding direction, gear 53 is rotated slightly in the clockwise direction as shown in FIG. 15, displacing the end portion of the cut restricting lever 84 from underneath the cutting lever 82 to allow cutting operations. When the cutting button 85 on the end portion of the cutting lever 82 is pushed downward as shown in FIG. 14, the movable blade 82a is pivoted to the cutting position indicated by a two dotted chain line. The printing tape 22 positioned between the fixed blade 81 and the movable blade 82a is cut through the force of these two blades. A cutting detection switch 101 installed on the main frame 11 is operated by an operation member 86 installed on the cutting lever 82 and outputs a cutting detection signal CS. After releasing pressure on the cutting lever 82, the cutting lever 82 is pivoted back to its original prescribed position indicated by the solid line, by urging force of a spring (not shown).

Next, the tape detection unit 90 will be described with reference to FIG. 2. The tape detection unit 90 is provided on the outer side of the tape cutting mechanism 80 for detecting the existence of the printing tape 22.

Guiding members 94 and 95 are provided integrally with main cover 2 at a position outside the tape cutting mechanism 90. The guiding members 94 and 95 are designed to form a tightly sealed pair of sensor accommodating chambers 96 and 97. A light emitting element 92 is installed in the sensor accommodating chamber 96, while a light receiving element 93 is installed in the sensor accommodating chamber 97. A slit 98 is formed between the pair of guiding members 94 and 95 to allow the printing tape 22 to pass therethrough. Light transmitting holes 94a and 95b having a small diameter are formed in the guide members 94, 95 in alignment with each other. The slanted guides 99 are also formed at the confronting portions between the guide members 94, 95. The slanted guide portions 99 are positioned at upstream side of the guide members 94, 95. The slanted guides 94 defines gradually narrowing passage so that the leading end of the tape 22 can easily be introduced into the slit 98. Therefore, the tape passing through the cutting mechanism 80 will reliably pass through this slit 98, so that the printing tape 22 can be accurately detected.

At this point, the-light emitted from the light emitting element 92 passes through the light transmitting holes 94a and 94b formed in the sensor accommodating chambers 96 and 97, and is received on the light receiving element 93. Therefore, when the printing tape 22 proceeds into the tape detection sensor 91, and the printing tape 22 is positioned between the light emitting element 92 and the light receiving element 93, the light is interrupted by the printing tape. Thus, the tape detection sensor 91 outputs an "L" level tape detection signal TS.

Figure 16:
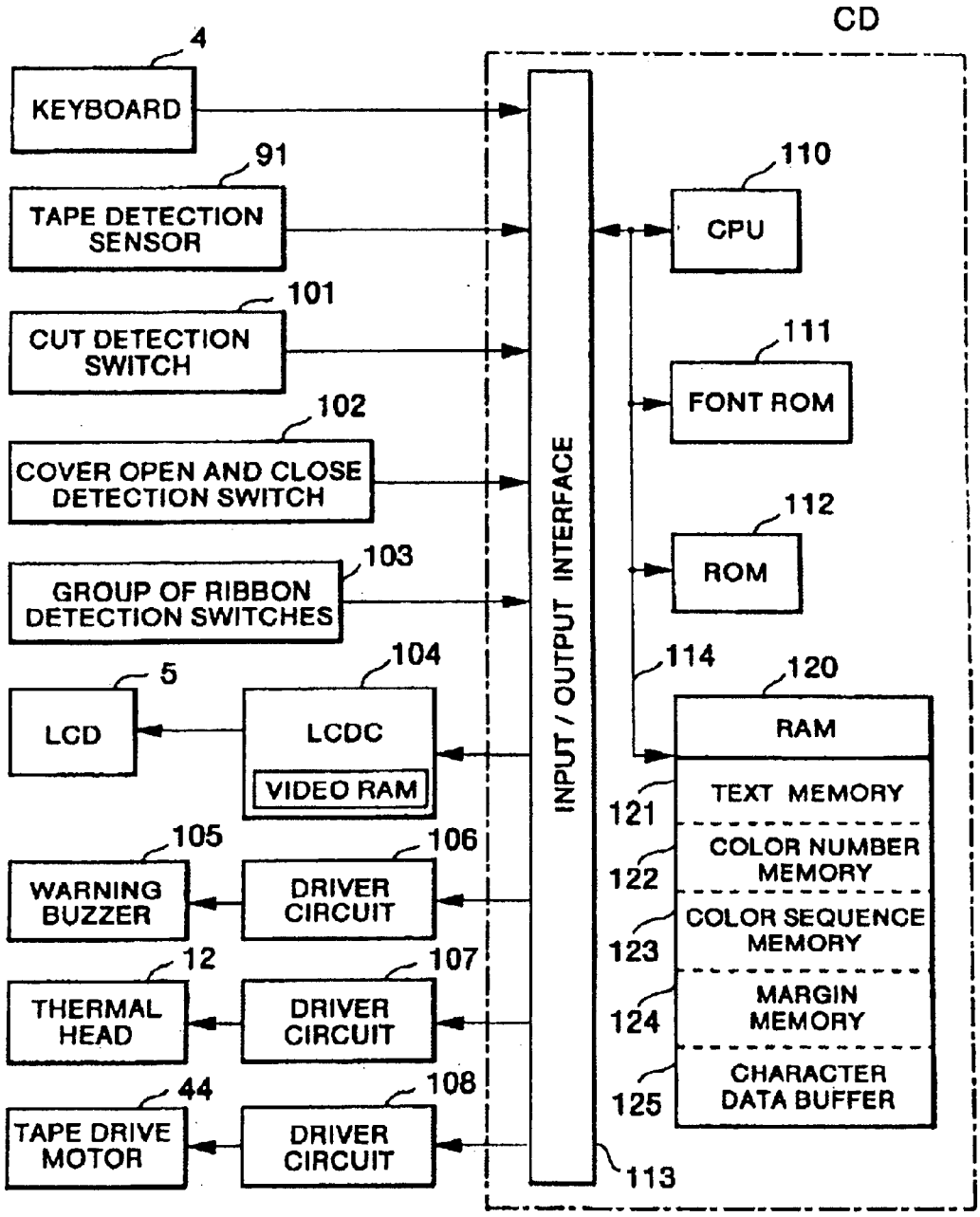
FIG. 16 is a block diagram of a control system of the tape-shaped label printing device.

The control system of the tape-shaped label printing device 1 is configured as shown in the block diagram of FIG. 16. Connected to an input/output interface 113 of a control device CD are the keyboard 4, the tape detection sensor 91, the cutting detection switch 101, the cover open and close detection switch 102, the group of ribbon detection switches 103, a display controller (LCDC) containing a video RAM for outputting display data to the liquid crystal display (LCD) 5, a driver circuit 106 for a warning buzzer 105, a driver circuit 107 for driving the thermal head 12, and a driver circuit 108 for the tape drive motor 44.

The control device CD includes a CPU 110, the input/output interface 113 connected to the CPU 110 via buses 114 including a data bus, a font ROM 111, a ROM 112, and a RAM 120. The font ROM 111 is adapted for storing dot pattern data for display, concerning all of the numerous characters, such as the alphabetic characters and symbols, and dot pattern data for printing in a plurality of printing character sizes.

The ROM 112 stores therein a display drive control program, a printing control program, a printing drive control program, and a control program. The display drive control program is adapted for controlling the display controller 104 to respond to the code data of alphabetic characters, symbols, numbers, and other characters those input from the keyboard 4. The printing control program is adapted to create dot pattern data, for printing, of the characters, symbols, and the like stored in a text memory 121. The printing drive control program is adapted for outputting the created dot pattern data for each row of dots in sequence to the thermal head 12, the tape drive motor 44, and the like for printing. The control program described later is adapted for controlling printing of multiple colors, which is a characteristic of this invention.

Incidentally, the ROM 112 stores a ribbon cassette detection table for detecting the color and width of the ink ribbon 32, based on the ribbon detection signal RS output from the group of ribbon detection switches 103, including detection switches Nos. 1 through 6.

The text memory 121 of the RAM 120 stores therein text data, such as alphabetic characters and symbols, input from the keyboard 4, in correspondence to the data for the printing color selected. A color number memory 122 stores therein data of the number of printing colors inputted. A printing color sequence memory 123 stores therein data of the printing color sequence selected. A margin memory 124 stores therein data of the size of the margin selected, where the front or top margin and rear or bottom margin are identical to each other. A printing-data buffer 125 stores the developed dot pattern data corresponding to the character codes stored in the text memory 121. Further, the RAM 120 is provided with a memory for temporarily storing such data as the results of computation by the CPU 110.

Next, multi-color printing control routines carried out in the control device CD of the tape-shaped label printing device 1 will be described with reference to flow charts of FIGS. 17 through 25. Incidentally, the symbols Si (i=10, 11, 12 . . . ) in the flow charts indicate steps.

Before entering into a substantive description as to the multi-color printing control, an explanation will be given based on FIG. 26, which shows the tape detecting position by the tape detection sensor 91, the tape cutting position by the tape cutting mechanism 80, and the printing position by the thermal head 12. Using the feeding direction T of the printing tape 22 and beginning on the upstream side with respect to the tape feeding direction, the positioning order is then the printing position (P position), the tape cutting position (C position), and the tape detection position (S position). The distance Dcp between the printing position P and the tape cutting position C is about 25 mm. The distance Dsc between the tape cutting position C and the tape detection position S is about 15 mm. Further, the separation position (B position), according to the separation portion 35a of the separation member 35, is about 6 mm downstream from the printing position P in the feeding direction T.

Figure 17:
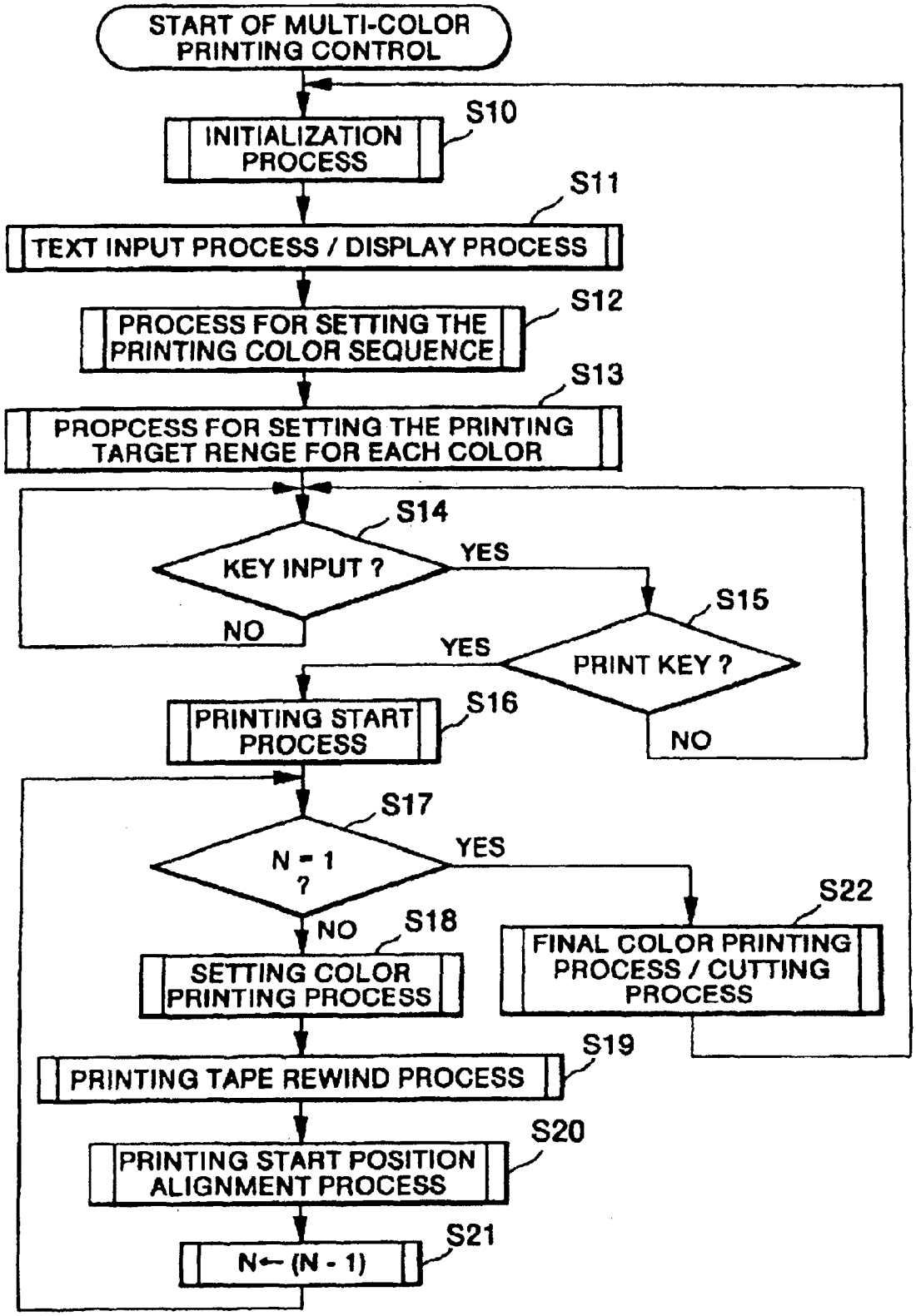
FIG. 17 is a general flow chart of the multi-color printing control routine.

In FIG. 17, when electrical power is supplied into the tape-shaped label printing device 1, first an initialization process is performed in step S10 to initialize the thermal printing mechanism 10 and the control device CD. Then, the text input screen is displayed on the display 5. After setting printing styles, processes such as the input process for inputting text data and the display process for displaying the-input text are carried out. The input text data is stored in the text memory 121 in step S11. For example, as shown in FIG. 27 input text data of "AB" "CDE" and "FG" are stored in the text memory 121 with a space "SP" between the neighboring character arrays.

Figure 18:
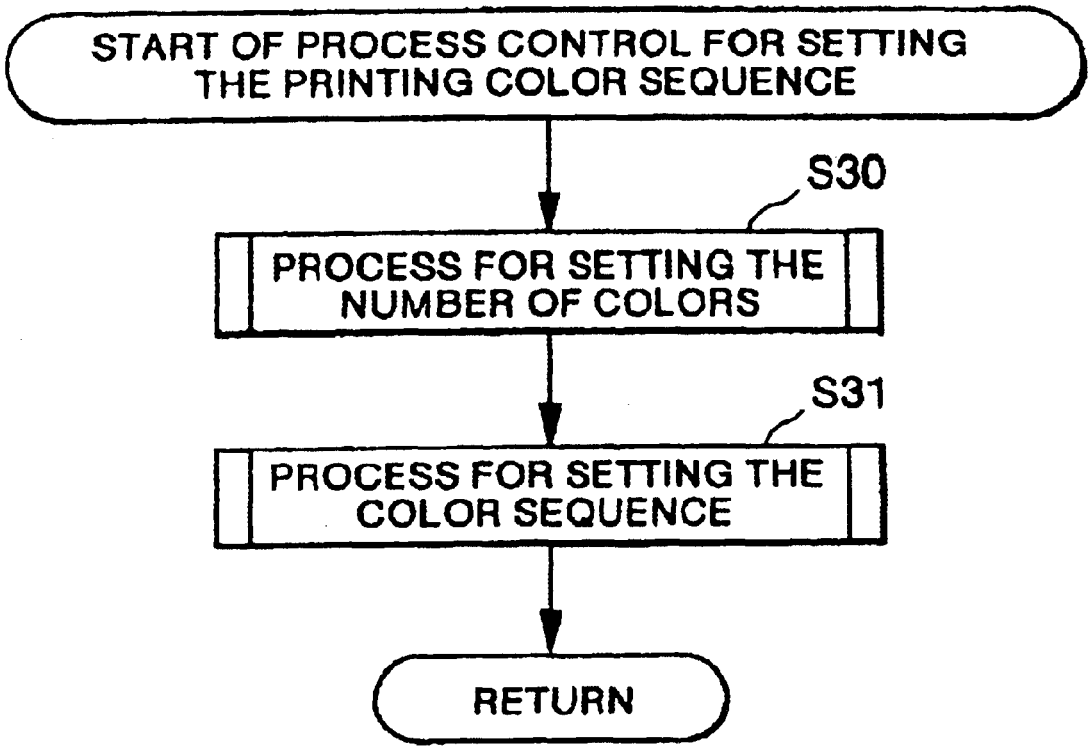
FIG. 18 is a flow chart of the process control for setting the printing color sequence routine.

After the step S11 the routine goes into step S12 where a process for setting the printing color sequence is executed as best shown in FIG. 18. When this control begins, the message "Number of colors?" is displayed on the display 5, and the process for setting the number of colors is executed to set the number N of colors by using the numeric keys. The number N of colors set is stored in the color number memory 122 in step S30. Next, the names of a plurality of colors are displayed in the display 5, and the process for setting the color sequence is executed to set the order of the color sequence to be supplied in printing. The set color sequence data is stored in the printing color sequence memory 123 in step S31. In the illustrated embodiment, the number N is "3" and the color sequence is in order "red", "green" and "black". Control is then returned to the multi-color printing control (S13).

Figure 19:
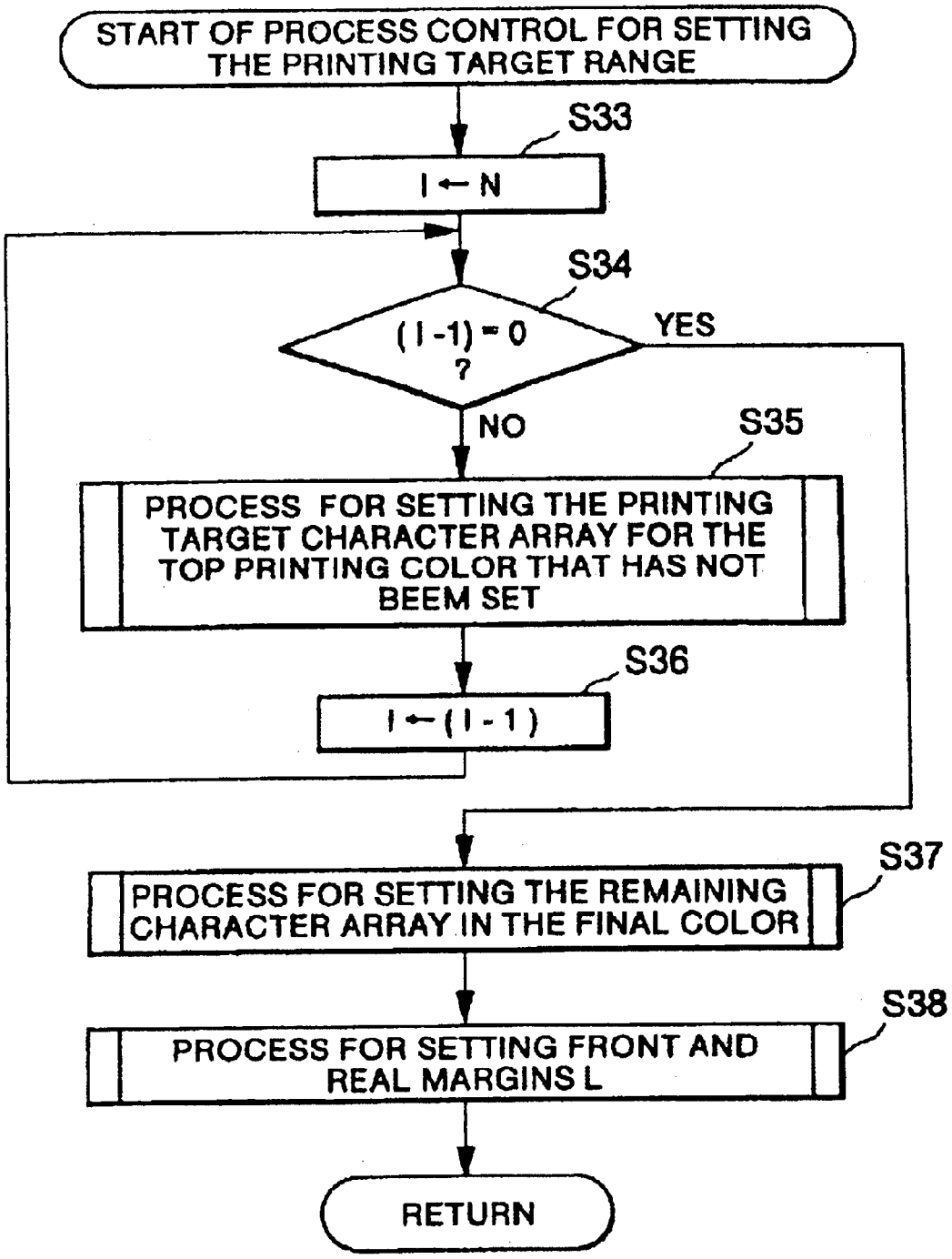
FIG. 19 is a flow chart of the process control for setting the printing target range routine for each color.

Next in the multi-color printing control, the process control for setting the printing range of each color is executed in step S13 as shown in FIG. 19.

When this control begins, the color number N is set in a color number counter as a count value I (S33). Then, subtraction of "I" from the color number count value I is executed and if the answer is not zero, that is, if the character array is not the final target character array in connection with the final color (S34: No), then the process for setting the printing target character array is executed in S35 so as to make correspondence of the character array with the first color among the remaining colors based on the color sequence data. This setting is performed by indicating the characters, symbols and the like constituting the target character array, with cursor, in connection with the color.

That is, during this process for setting the printing target character array, the text data is displayed in the display 5. Therefore, by operating the four cursor movement keys provided on the right side of the keyboard 4, each characters, symbols and the like-in the printing target array is indicated with the cursor with respect to the printing color but except for the last printing color. Each time the character-color setting is made by the cursor, a color set key is pressed. After completing setting of the printing target character arrays, a set key is pressed. By pressing this set key, the set color data is appended to the character data of the characters indicated by operating the cursor movement keys and pressing the color set key, and this date is stored in the text memory 121.

Then, the color number count value I is decremented by 1 (S36), and steps S34 through S36 are repeated until (I−1) equals zero. When (I−1) equals zero, that is, when the setting of the printing target character array with respect to all of the printing colors except the last color have been completed (S34: Yes), a process for setting a final color to the character array is executed in Step S37 in order to make correspondence of the remaining characters and symbols in the text data that have not already been set with the last printing color.

Figure 20:
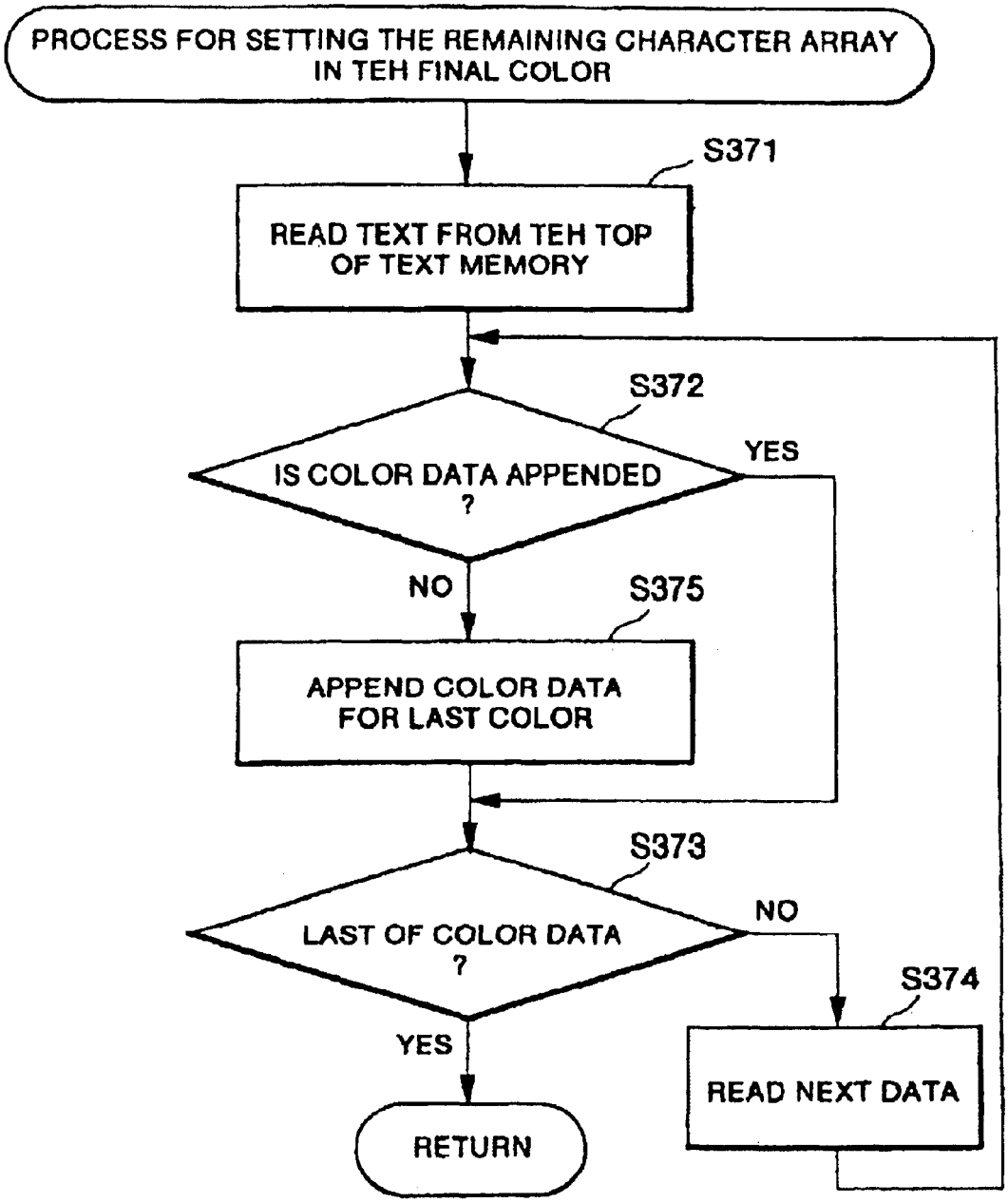
FIG. 20 is a flow chart of the process control for setting the final printing color with respect to the remaining character array.

Next, the process for setting the final color to the remaining character array will be described in detail with reference to FIG. 20. First, the character data stored in the text memory 121 is retrieved from the top of the memory (S371). The data is checked to sea if color data is appended or not (S372). If color data is appended to the character data read (S372: Yes) and that character data is not the last of the character data (S373: No), then the next data is retrieved (S374), and the process is repeated from S372. However, if color data-is not appended to the retrieved character data (S372: No), color data corresponding to the final printing color is appended to that character data and stored in memory (S375), and the process at S373 is executed. All of the above-mentioned processes are repeated until the end of the character data stored in the text memory 121. When the data is found at S373 to be the last of the character data (S373: Yes), then control is returned to S38 of FIG. 19.

Provided that the character data "AS CDE "FG" is stored in the text memory 121, the color number N is set to "3," and the color sequence is set to "red," "green," and "black". During the process for setting the printing target character array in S35, first, the character array "AB" is set for the printing color red by operating the cursor keys and the color set key. As shown in FIG. 27, the color data "red" is appended to the character data "A" and "B" of the text memory 121, and each combination of character data and color data is stored in the memory 121. Next, the character array "CDE" is set for the printing color "green," and the color data "green" is appended to the character data "C," "D" "E" of the text memory 121, and stored.

When setting of the printing color "green" is completed, the color number count value I is such that (I−1) is zero. Therefore, in the process for setting the character array with respect to the final color in S37, the character data of the text memory 121 is read in order, beginning from the top of the memory 121. The character array "FG" of the text data, which has not been set to a printing color, is automatically set to the final printing color, "black," and the printing date "black" is then saved in the text memory 121, appended to the character data "F" and "G".

Next, the message "Margin for the printing tape?" is displayed in the display 5. The margins are set to the desirable size by operating the number keys, and the margin set is stored in the margin memory 124 in step S38. Control is then returned to S14 for continuing the multicolor printing control.

Figure 21:
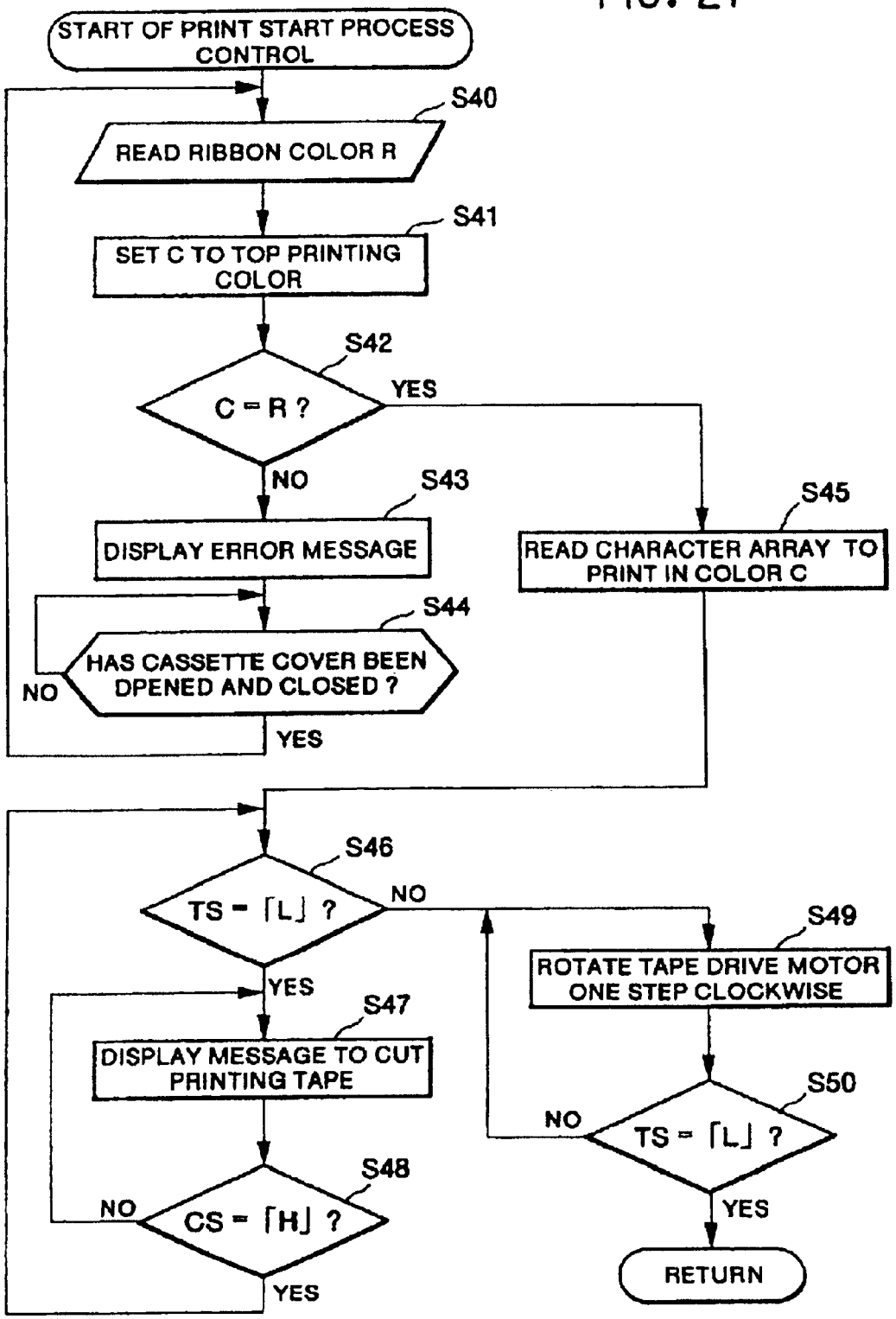
FIG. 21 is a flow chart of the print start process control routine.

When the printing key is pressed in the multi-color printing control (S14: Yes, S15: Yes), the printing start process control (S16) is executed, as shown in FIG. 21.

When this process begins, first, the ribbon color R of the ribbon cassette 30 mounted in the tape cassette 20 is read (S40), based on ribbon detection signals RS from the group of ribbon detection switches 103. Then, the leading printing color C in the printing color sequence is read (S41). If the ribbon color R does not match the leading printing color C (S42: No), then an error message is displayed in the display 5 (S43) indicating that the ribbon color does not match the printing color.

After the cassette cover 3 is opened, the ribbon cassette 30 is replaced by another ribbon cassette 30 having am intended ribbon color R, and the cassette cover 3 is closed again. Through the cover opening movement, the cover open and close signal VS is transmitted from the cover open and close detection switch 102, so that the steps S40 and S41 are repeated. Then, if the ribbon color R matches the leading printing color C (S42: Yes), the stored character array appended with data of the leading printing color C is retrieved from the text memory 121. Further, the dot pattern data of that character array is developed in the printing data buffer 125 (S45).

Then, the tape detection signal TS is read from the tape detection sensor 91. If the tape detection signal TS is "L" level, meaning that the printing tape 22 is positioned in confrontation with the tape detection sensor 91 (S46: Yes), then a message prompting that the printing tape be cut is displayed in the display 5 (S47).

Next, the cutting button 85 is pressed for cutting the printing tape 22, and the cut detection signal CS from the cut detection switch 101 becomes "H" level (S48: Yes). Then, the tape detection signal TS becomes "H" level, meaning the tape cutting was detected (S46: No), and the tape drive motor 44 is driven by one step only in the clockwise direction, and the printing tape 22 is moved a very small distance in the feeding direction T so as to allow the leading edge of the tape to reach the tape detection point to be detected by the-tape sensor 91 (S49). As far as the tape detection signal TS maintains "H" level, steps S49 and S50 are repeated.

Figure 28A:
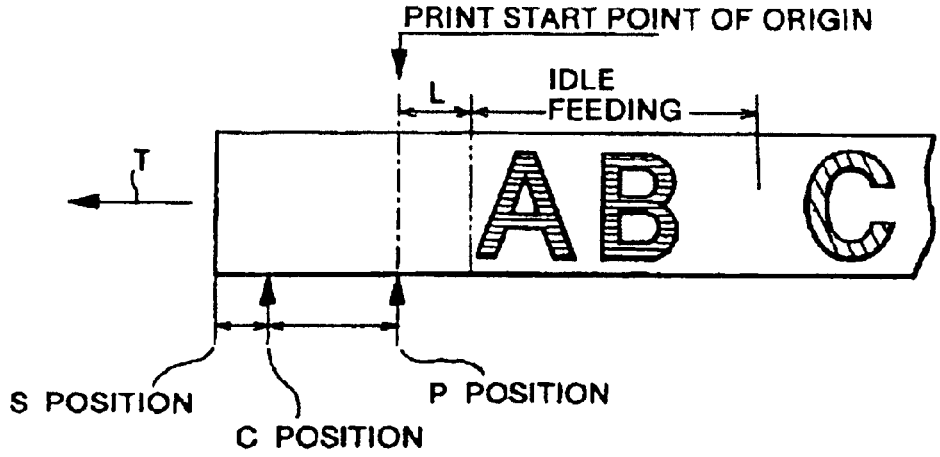
FIG. 28(a) is an explanatory diagram of the print start point of origin on the tape.
Figure 28B:
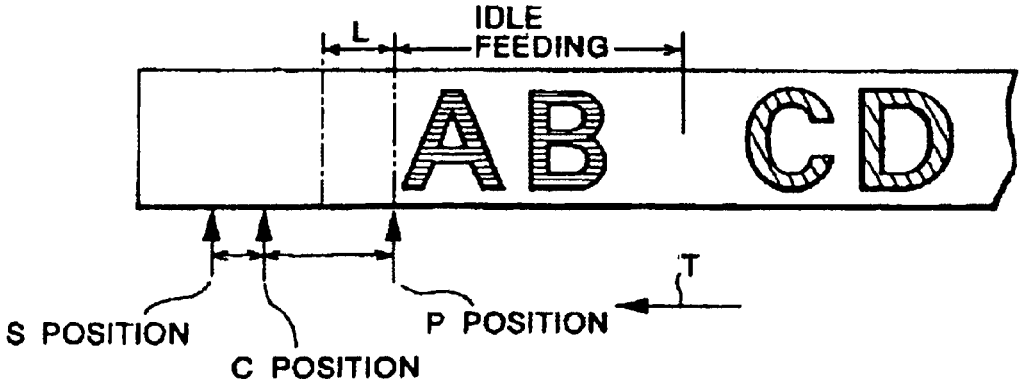
FIG. 28(b) is an explanatory diagram showing the point at which the tape has been supplied by the length of the front margin.

When the tape detection signal TS becomes "L" level, signifying that the leading edge of the printing tape 22 has reached the tape detection sensor 91 (S50: Yes) as shown in FIG. 28(a), control is returned to S17 of the multi-color printing control. At this time, that is, when the leading edge of the printing tape 22 reaches the tape detection point S, a printing position of the printing tape 22 confronting the thermal head 12 is set as a print start point of origin.

Here, during step by step movement of the printing tape 22 in the feeding direction T, the leading edge of the printing tape can be reliably guided through the slit 98 by means of the slanting guides 99 formed on the pair of guide members 94 and 95, so that the leading edge of the tape can reach the tape detecting position S, even if the leading edge portion of the printing tape 22 is curled.

It should be noted that the cutting process in step S48 is necessary so as to define the positional relationship between the printing tape 22 and the thermal head 12 in order to obtain the print start point of origin. In FIG. 28(a), the leading edge of the tape is provided by cutting the tape at the cutting position C and then, the tape is fed by the distance Dsc, so that the front cut end reaches the position S.

Figure 22:
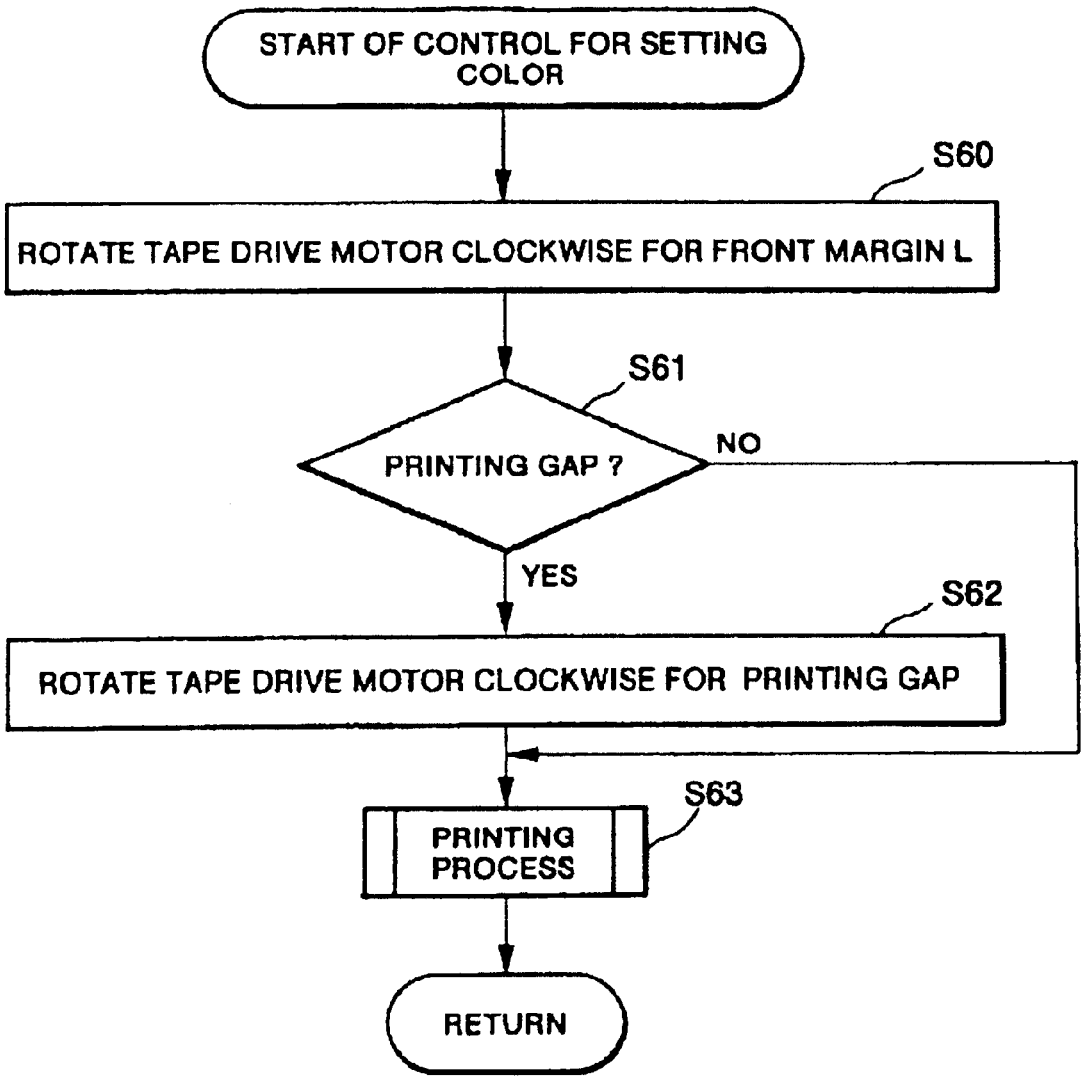
FIG. 22 is a flow chart of the process for setting the color routine.

Next, in the multi-color printing control, when the color number N is not "1", that is, when the printing process is not on the last color (S17: No), the process for setting the color (S18) is executed to print the selected printing color, as shown in FIG. 22.

When this control begins, first, the tape drive motor 44 is driven in the clockwise direction to move the printing tape by the initial margin L corresponding to the set front margin L (S60).

Figure 28C:
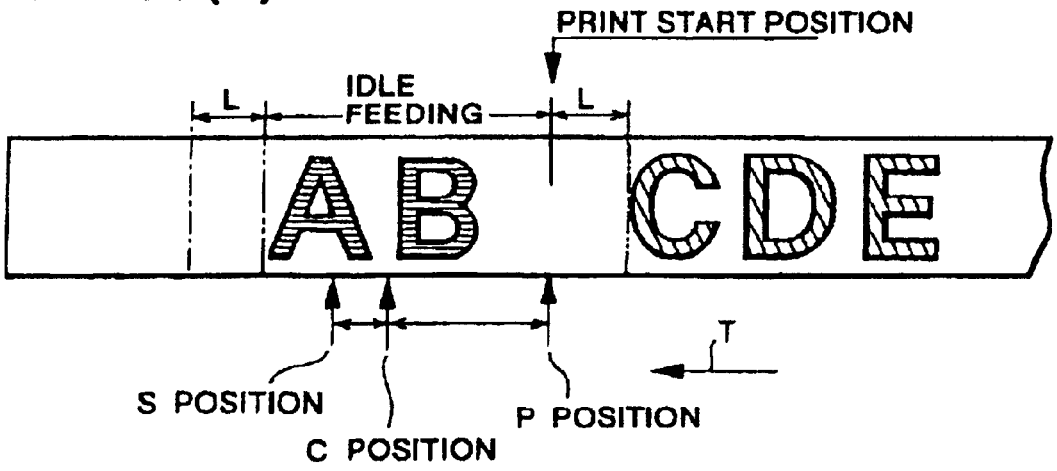

If the printing start position of characters to be printed-in the current printing color is still positioned upstream of the print start point of origin in the feeding direction T, even after the feeding of the printing tape by the length of the front margin L, (S61: Yes), for example, as shown in FIG. 28(c), if idle feeding (or feeding of the tape without printing) is required such that the characters "CDE" with the printing color "green" is to be printed, the tape drive motor 44 is driven in the clockwise direction, so as to move the printing tape 22 in the feeding direction T only the amount of the idle feeding (S62). However, if no idle feeding of the tape is required (S62: No) after feeding of the printing tape by the length of the front margin L, for example in case of printing of "AB", the routine is skipped into the step S63 without executing the step S62. The dot pattern data developed in the printing data buffer 125 is retrieved, and the printing process is executed by driving the thermal head 12, the tape drive motor 44, and the like for printing (S63). Control is then returned to S19 of the multi-color printing control.

Figure 23:
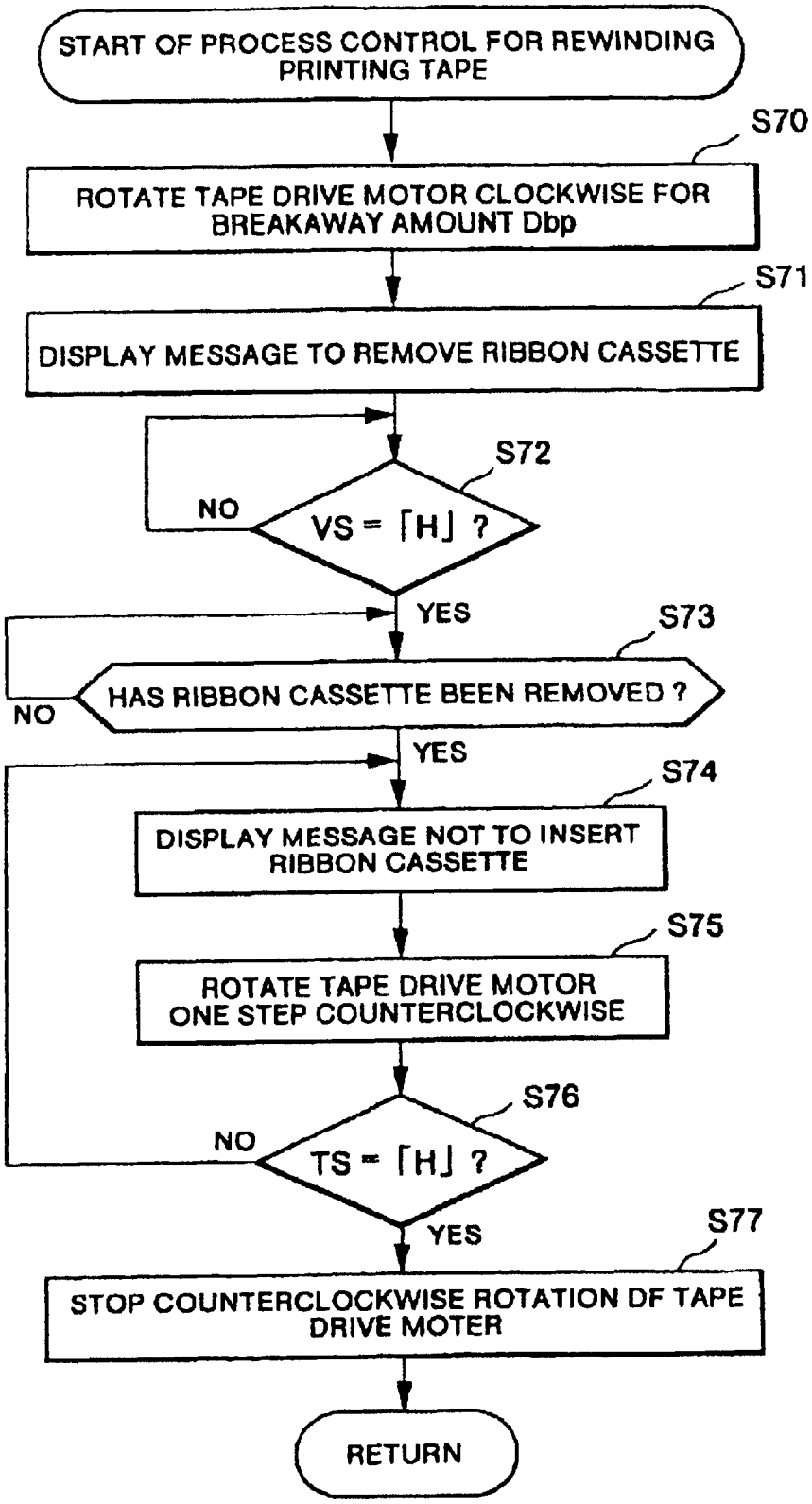
FIG. 23 is a flow chart of the printing tape rewinding process control routine.

Next, in the multi-color printing control, the printing tape rewinding process control (S19) is executed as shown in FIG. 23.

When this control is begun, first, the tape driving motor 44 is driven in the clockwise direction for moving both the printing tape 22 and the ink ribbon 32 in the feeding direction T by only the separation feeding distance Dbp corresponding to the distance Dbp between the printing position (P position) and the separation position (B position) (S70). This feeding is required because the ink of the ink ribbon 32 is fused or melted to the printing tape 22 by the thermal head 12 at the final printing position. However, because the printing tape 22 and the ink ribbon 32 are moved by only the separation feeding distance Dbp, the ink ribbon 32 is forcibly pulled away from the printing tape by the separation portion 35a. Thus, the printing tape 22 and the ink ribbon 32 are separated with certainty.

Next, in order to replace the ribbon cassette 30 with one that has an ink ribbon 32 of the same color as the next printing color, a message prompting for the ribbon cassette 30 to be removed is displayed in the display 5 (S71). Then, the cassette cover 3 is opened, moving the operation plate 74 in the rearward direction, and an "H" level cover open and close signal VS is output from the cover open and close detection switch 102 (S72: Yes). In addition, all six of the detection switch signals become "H" level signals, as the ribbon detection signal RS from the group of ribbon detection switches 103. When the ribbon cassette 30 has been removed (S73: Yes), a message prompting the user not to insert another ribbon cassette 30 is displayed in the display 5 (S74).

Next, to rewind the printing tape 22, the tape drive motor 44 is driven one step only in the counterclockwise direction, moving the printing tape 22 a very slight distance in the rewinding direction (S75). During this rewinding operation, if the tape detection signal TS is "L" level (S76: No), steps S74 through S76 are repeated. Then, if the leading edge of the printing tape 22 is rewound until it is slightly on the upstream side of the tape detection sensor 91, the counter-clockwise rotation of the tape drive motor 44 is stopped (S77). Control is then returned to S20 of the multi-color printing control.

Figure 24:
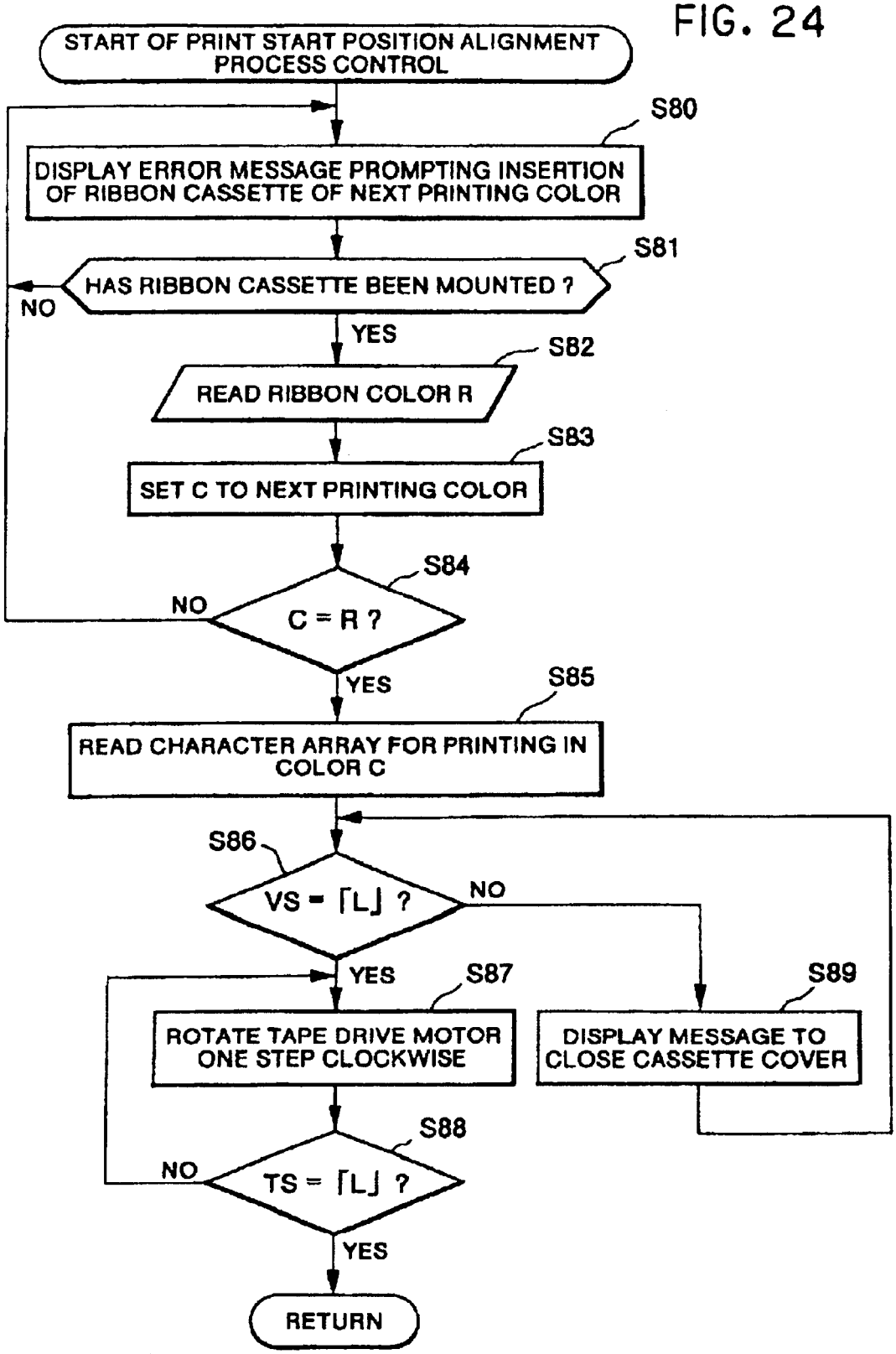
FIG. 24 is a flow chart of the print start position alignment process control routine.

Next, in the multi-color printing control, the printing start position alignment process control (S20) is executed, as shown in FIG. 24.

When this control is begun, first, an error message prompting the user to insert a ribbon cassette 30 having an ink ribbon 32 of the same color an the next printing color is displayed in the display 5 (S80). Then, if all of the six switch signals making up the ribbon detection signal RS are not the "H" level, signifying that the ribbon cassette 30 is mounted (S81: Yes), then the ribbon color R of the mounted ribbon cassette 30 is read based on the ribbon detection signals RS (S82). Then, the next printing color C of the printing color sequence is read (S83). If the ribbon color R does not match the next printing color C (S84: No), then steps S80 through S84 are repeated.

When the ribbon color R matches the next printing color C (S84: Yes), the stored character array appended with the data for the next printing color C is read from the text memory 121. Further, dot pattern data for that character array is developed in the printing data buffer 125 (S85). When the cassette cover 3 is not closed (S86: No), a message prompting for the cassette cover 3 to be closed is displayed in the display 5 (S89). When the cassette cover 3 has been closed (S86: Yes), the tape drive motor 44 is driven one step only in the clockwise direction, until the leading edge of the printing tape 22 corresponds to the tape detection sensor 91 (S67 and S88: No). If the tape detection signal TS becomes "L" level when the leading edge of the printing tape 22 corresponds to the tape detection sensor 91, the print start point of origin for the printing tape 22 corresponds to the print position of the thermal head 12 (S88: Yes). For example, the positional relationship shown in FIG. 28(a) is again provided. Control is then returned to S21 of the multi-color printing control.

Figure 25:
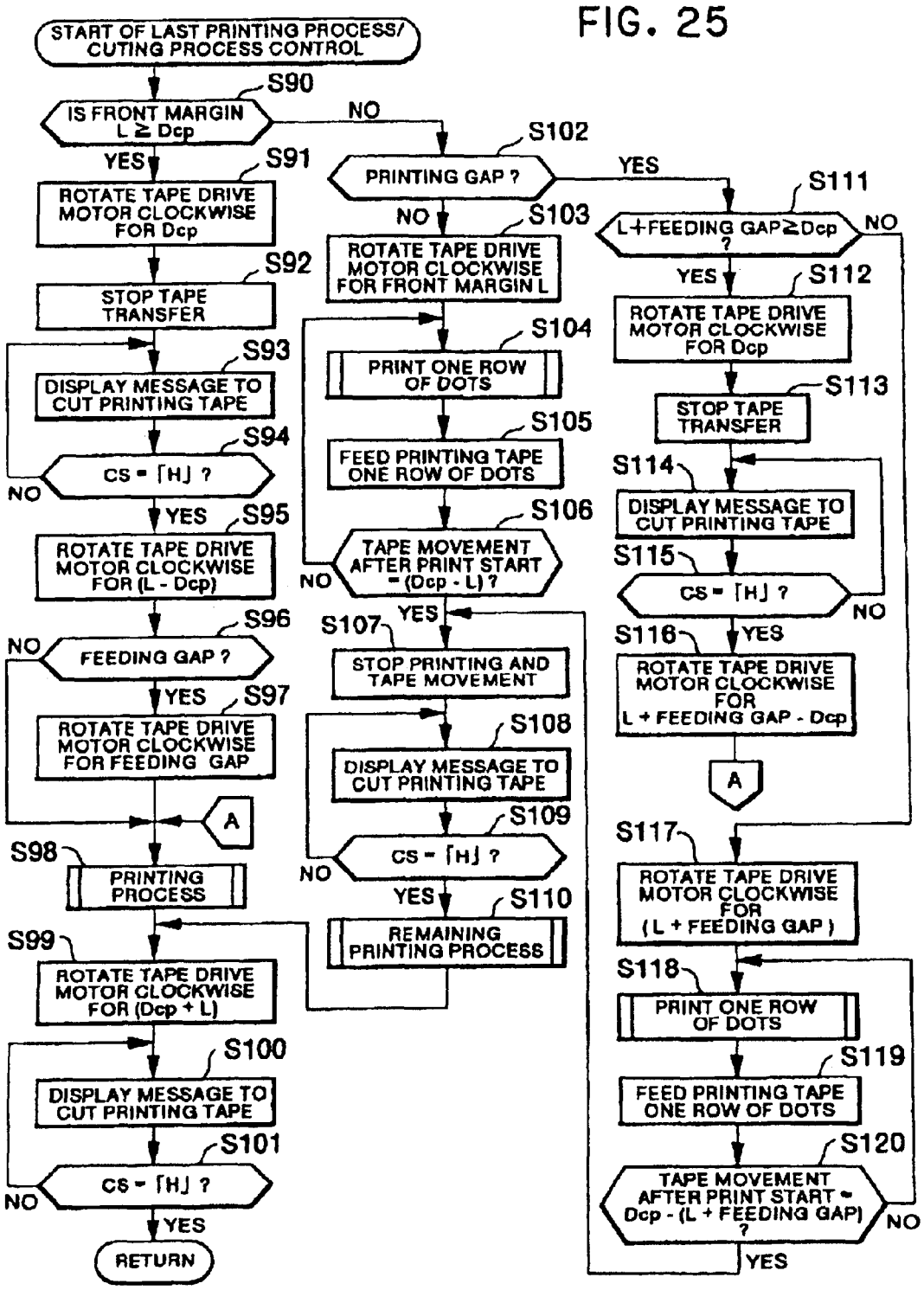
FIG. 25 is a flow chart of the final color printing process and cutting process control routine.

Next, in the multi-color printing control, the color number N is decremented by one (S21). If the color number is not "1," or not the final printing (S17: No), steps S18 through S21 are repeated. If the color number N becomes "1," or the final printing (S17: Yes), the final color printing process and cutting process control (S22) will be executed, as shown in FIG. 25.

This control is classified into four cases. In case 1, the front margin L is greater than the distance Dcp between cutting and printing positions. In case 2, the front margin L is smaller than the Dcp, and no idle feeding is provided. In case 3, the front margin L is smaller than the Dcp, and idle feeding is provided, and further, the total length of the front margin L and the idle feeding is equal to or greater than the distance Dcp between the printing position and the cutting position. In case 4, the front margin L is smaller than the Dcp, and idle feeding is provided, and further, the total length of the front margin L and the idle feeding is smaller than the distance Dcp between the printing position and the cutting position.

First, case 1 will be described. If the front margin L is greater than the Dcp (S90: Yes), the printing tape 22 is moved only the distance Dcp in the feeding direction T by the tape drive motor 44 being driven in the clockwise direction (S91). Then, the drive of the tape drive motor 44 is stopped, stopping the tape movement (S92). Next, the tape drive motor 44 is rotated a little in the rewinding direction. When the end portion of the cut prevention lever 84 is removed from beneath the cutting lever 82, making the cutting operation possible, as shown in FIG. 15, a message prompting the user to cut the printing tape 22 is displayed in the display 5 (S93). Then, when the printing tape 22 is cut and the cutting detection signal CS becomes the "H" level, signifying the tape cutting has been detected (S94: Yes), the printing tape 22 is moved in the feeding direction T by the remaining distance of the front margin L (front margin L-Dcp) (S95).

If the print start position of the last printing color is upstream from the print start point of origin in the feeding direction T, and there exists an idle feeding (S96: Yes), the tape drive motor 44 is driven in the clockwise direction, moving the printing tape 22 in the feeding direction T by the length of the idle feeding (S97). Then, the characters, symbols, and the like, based on the dot image data read similar to S63 described earlier, are printed in the final printing color (S98).

Next, in order to provide the rear margin L behind the printed character array, the tape drive motor 44 is driven in the clockwise direction, moving the printing tape 22 in the feeding direction T only by the distance Dcp plus the rear margin L (S99). Then, the tape drive motor 44 is rotated slightly in the rewinding direction. When the end portion of the cut prevention lever 84 is removed from beneath the cutting lever 82, making the cutting operation possible, a message prompting the user to cut the printing tape 22 is displayed in the display 5 (S100). Then, when the printing tape 22 is cut and the cutting detection signal CS becomes the "H" level, signifying the tape cutting has been detected (S101: Yes), control is returned to S10 of the multi-color printing control.

Next, case 2 will be described. When the front margin L is less than the distance Dcp and no idle feeding exists (S90 and S102: NO), the tape drive motor 44 is driven in the clockwise direction for moving the printing tape 22 in the feeding direction T by the distance of the front margin L (S103). Then, the final printing process and cutting of the printing tape 22 is performed according to the steps beginning at S104.

More specifically, one row of the dot pattern data is read from the printing data buffer 125 and printing is performed with the one row of the dot pattern (S104). The tape drive motor 44 is driven in the clockwise direction, moving the printing tape 22 only by the short distance corresponding to the one row of dots (S105). If the amount of tape movement after the final printing has begun is less than a distance given by subtracting the front margin L from the distance Dcp, that is, if the top position of the front margin has not yet reached the cutting position (C position) (S106: No), then steps S104 through S106 are repeated.

When the top position of the front margin L has reached the cutting position (S106: Yes), the printing and tape movement are stopped (S107). Then, the tape drive motor 44 is rotated slightly in the rewinding direction. When the end portion of the cut prevention lever 84 is removed from beneath the cutting-lever 82, making the cutting operation possible, a message prompting the user to cut the printing tape 22 is displayed in the display 5 (S108). Then, when the cutting button 85 is pressed, the printing tape 22 is cut, and the cutting detection signal CS becomes the "H" level, signifying the tape cutting has been detected (S109: Yes).

Thereafter, printing of the remaining dot pattern data to be printed is carried out (S110). The rear margin L is provided according to the above described steps S99 through S101, and the tape is cut, and control is returned to S10.

Next, case 3 will be described. When the front margin L is smaller than the distance Dcp between the printing position P and the cutting position C, and an idle feeding exists and the total length of this idle feeding and to the front margin L is greater than the distance ocp (S90: No; S102 and S111: Yes), the tape is moved as in the previously described steps S91 through S94, and the tape is cut (S112 through S115). Further, the printing tape 22 is moved in the feeding direction T by a distance (front margin L+idle feeding−Dcp) (S116). Then, the steps beginning from S98 are executed, so that printing in the final color is performed (S98), and the rear margin L is provided (S99), and the tape is cut (S101). Control is then returned to S10.

Finally, case 4 will be described. When the front margin L is smaller than the distance Dcp, and an idle feeding exists, and the total length of the idle feeding and the front margin L is less than the distance Dcp (S90: No; S102: Yes; S111: No), the printing tape 22 is moved in the feeding direction T by the distance of the total length of the front margin L and the idle feeding (S117). Then one row of the dot pattern data is read from the printing data buffer 125 and printing is performed (S118). The tape drive motor 44 is driven in the clockwise direction, moving the printing tape 22 only by the short distance corresponding to the one row of dots (S119).

When the amount of tape movement after the final printing has begun is less than the difference between the distance Dcp and the total length of the front margin L and the idle feeding length, that is, the top position of the front margin L has not yet reached the cutting position, (S120: No), then steps S118 through S120 are repeated.

When the top position of the front margin L has reached the cutting position (S120: Yes), the steps beginning from S107 are executed. In this way, the front margin L is provided in S109, and the rear margin L is provided in S101. Control is then returned to S10.

Figure 29:
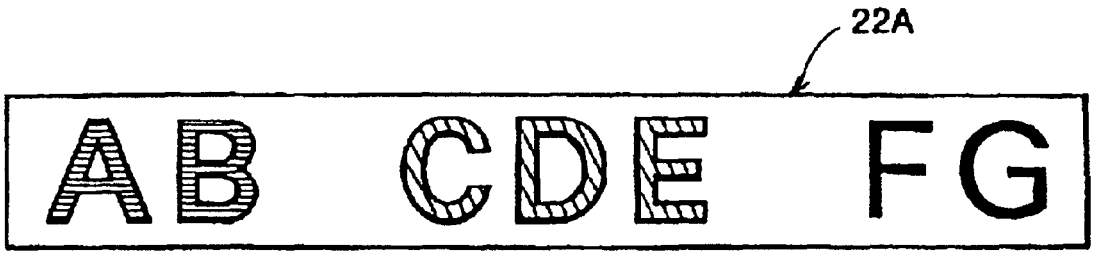
FIG. 29 is a plan view of the tape-shaped label printed in the three colors red, green, and black.

As in the example of the input text "AS CDE FG" shown in FIG. 29, a label was obtained with the front and rear margins L, the character array "AB" printed in the color red, the character array "CDE" printed in the color green, and the character array "FG" printed in the color black.

In the illustrated embodiment, after the text is input, the process for setting the printing color sequence in executed to set the color number N and the color sequence of the printing colors. Then, a process to set the printing object range for each of the colors among a plurality of colors to be printed is executed. In this process, a front margin which is a distance between the front end of the tape and the print start position is also set.

Thereafter, prior to the printing process, print start process is executed. In the print start process, the printing tape 22 is fed in the feeding direction T after cutting the print tape 22. This cutting process is conducted to provide the front end of the tape. The printing position of the thermal head 12 with respect to the printing tape 22 when the leading edge of the tape is detected by the tape detection sensor 91 is set as the print start point of origin. Each time the printing process is executed with the set color, the tape rewinding process is executed and, the print start position adjustment process is executed. In the print start position adjustment process, after the ribbon cassette 30 is exchanged with a new ribbon cassette, the printing tape 22 is fed in the feeding direction T, and each printing process with the set color is executed from the print start point of origin on the tape when the leading edge of the printing tape is detected by the tape detection sensor 91.

In this way, in the printing with the first color, the printing tape 22 is fed in the tape feeding direction, and the position of the thermal head 12 with respect to the tape 22 is set as the print start point of origin in response to the detection signal TS which is transmitted when the leading edge of the tape is detected by the tape detection sensor 91. After each printing is executed with the subsequent order of colors, the printing tape 22 is rewound and, each time the leading edge of the tape is detected by the tape detection sensor 91, the print start point of origin is set and printing process is executed from the point of origin. Accordingly, even if error is appearing in the tape rewinding amount due to the slippage of the printing tape 22 with respect to the platen roller 65 and backlash of the plurality of gears provided in the tape/ribbon transfer mechanism 40 when the printing tape 22 undergoes rewinding, the print start point of origin can be set accurately in each printing operation for plural times of printing because the pint start point of origin is not dependent on the tape rewinding amount of the printing tape.

Figures 26, 27:
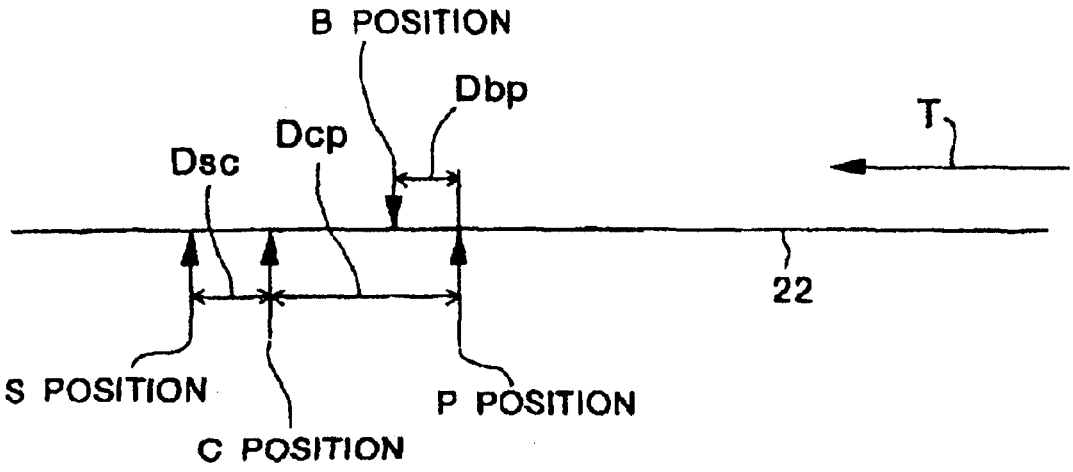
FIG. 26 is an explanatory diagram showing the positioning relationship between the printing position (P position), the tape cutting position (C position), and the tape detection position (S position)
FIG. 27 is an explanatory diagram showing the data configuration of the text memory.

In the print start process and the print start position adjustment process, a distance between the tape detecting position of the tape detection sensor 91 and the printing position of the thermal head 12 is always constant, that is, the distance is the sum of the print-cutting distance Dcp (about 25 mm) and the cutting-detection distance Dsc (about 15 mm) as shown in FIG. 26. Therefore, print start position can be easily set since the printing can be started when the tape detection signal TS is transmitted from the tape detection sensor 91. Further, the print start position in the first to last printing operation is set at a position spaced away from the front end of the tape by a predetermined length. Accordingly, precise print start position can be provided which is not dependent on the accuracy of the tape winding mechanism.

Further, as shown in FIGS. 2 and 26, the tape detection sensor 91 is positioned downstream of the tape cutting position (C position) of the tape cutting mechanism 80 in the tape feeding direction, and further, a pair of guide members 94 and 95 provided with the guide portions are provided at the position adjacent to the upstream end or tape rewinding side of the tape detection sensor 91. Therefore, when the printing tape is rewound until the leading edge of the printing tape 22 is detected after each printing operation, the leading edge portion of the tape 22 is always positioned downstream of the tape cutting position. Thus, even if the tape 22 has a curling nature, the leading edge portion of the tape 22 can be introduced without fail into the slit 98 by way of the guiding portions of the pair of guide members 94, 95. Consequently, the leading end portion of the tape 22 is not jammed at the stationary blade 81 and the movable blade 82a, to thereby provide smooth transfer of the tape 22.

Further, in the final printing operation, the final color printing process and cutting process-is performed. If a distance between the cutting position of the cutting mechanism 80 and the print start position becomes equal to the preset front margin length L, feeding of the printing tape 22 is suspended. Consequently, printing tape can be cut by manipulating the cutting knob 85, so that the preset front margin length can be provided. The cutting prohibiting lever 84 is displaced from the lower portion of the cutting lever 82 only when the feeding of the printing tape is suspended. Therefore, accurate and timely cutting can be made.

In the last printing process and after the repeated printing and rewinding of the tape, when the distance from the tape cutting position of the tape cutting mechanism 80 to the print start position becomes equal to the front margin length L, the tape feeding is stopped, and the tape can be cut for providing the front margin L. Further, in every printing operation, the print start position is always constant at a position downstream of the front end of the tapes Therefore, the accurate print start position cart be provided irrespective of the accuracy of the tape transferring mechanism.

Further, in the tape cutting mechanism 80, manual cutting is achievable by manipulating the cutting knob 85, which is only manipulatable when the tape feeding is suspended. Accordingly, particular driving mechanism for driving the tape cutting mechanism is not required, and accordingly a compact and economical device can be provided. Moreover, erroneous tape cutting such as tape cutting operation during tape feeding or tape printing can be prevented. Furthermore, when the tape feeding is stopped, a message prompting the tape cutting is displayed on the display 5. Therefore, necessity of tape cutting can be easily recognized.

Figure 30:
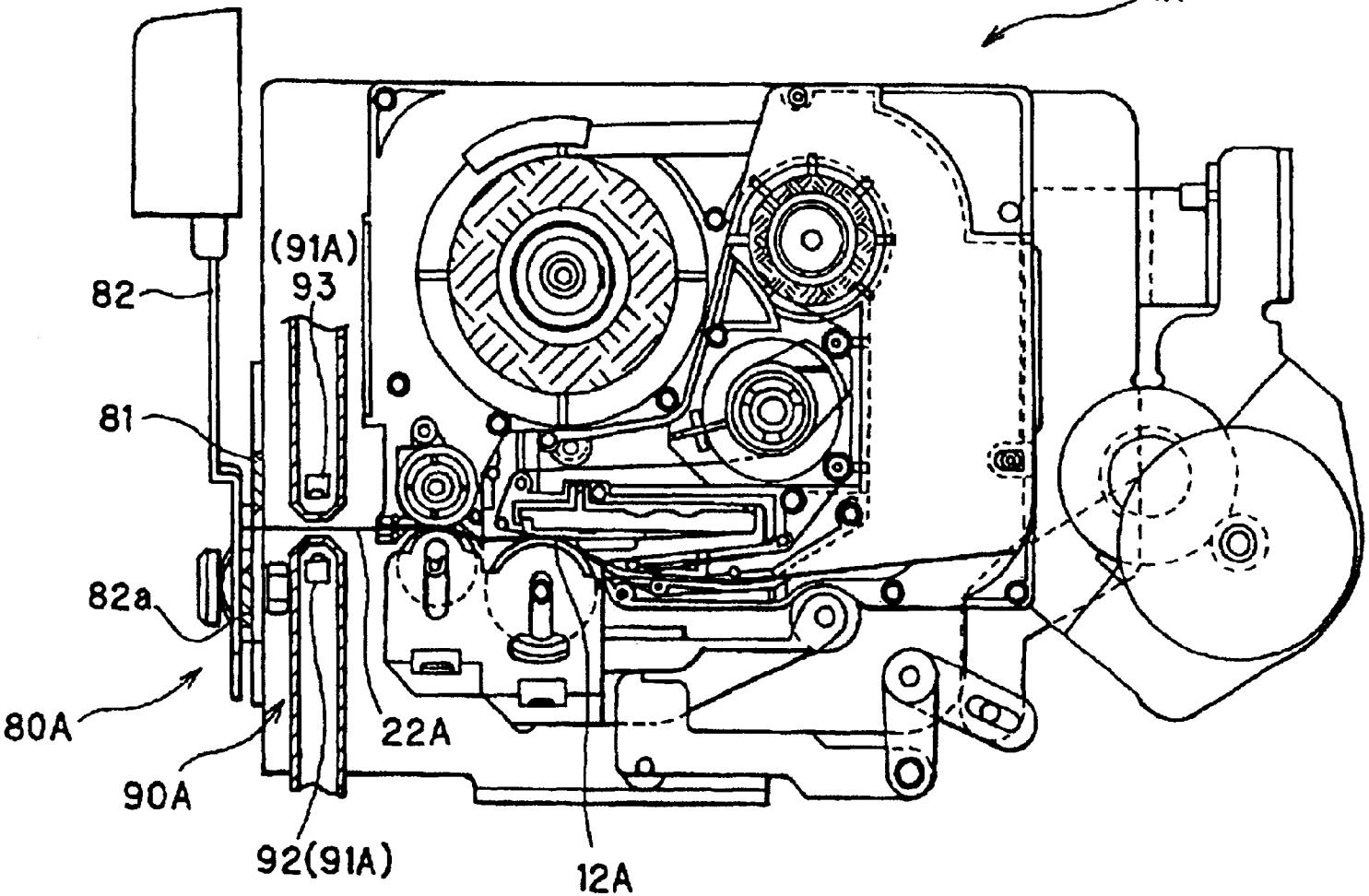
FIG. 30 is a plan view similar to FIG. 2 showing a modified embodiment in which a tape detection sensor is positioned upstream of the tape cutting mechanism in a tape feeding direction.

FIG. 30 shows a tape-shaped label printing device 1A according to another embodiment in which a tape detection mechanism 90A provided with a tape detection sensor 91A including a light emitting element 92 and a light receiving element 93 is positioned upstream of the tape cutting position of the tape cutting mechanism 80A in the tape feeding direction. The printing tape 22A printed by the thermal head 12A is fed past the tape cutting mechanism 80A after the tape has passed through the tape detection sensor 91A, and the tape is discharged outside.

In this case, the tape detection sensor 91A can be positioned close to the printing position of the thermal head 12 in comparison with the foregoing embodiment where the tape detection sensor 91A is disposed downstream of the tape cutting position in the tape feeding direction. Therefore, distance between the tape detecting position and tape cutting position can be reduced. That is, the distance between the front end of the printing tape 22 and the print start point of origin can be reduced. Consequently, a length of the tape 22A cut by the tape cutting mechanism 80A can be shortened after the final printing operation, for minimizing waste of the printing tape at every cutting operation.

While the invention has been described in detail with reference to the specific embodiments thereof, it would be apparent to those skilled in the art that various changes and modifications may be made therein without departing from the scope of the invention.

For example, in the illustrated embodiments when the removal of the ribbon cassette 30 is detected, a message prompting the user not to insert another ribbon cassette 30 is displayed in the display 5, and then, rewinding of the printing tape 22 is automatically begun. However, alternative process may be conceivable. For example, rewinding of the printing tape 22 is not begun immediately in spite of the detection of the removal of the ribbon cassette 30. Instead, automatic tape rewinding operation can be started after elapse of predetermined period during which the removal of the ribbon cassette 30 has been completed. Another alternative may be such that a message such as "Press the some key" is displayed in the display 5 along with the message prompting the user not to insert another ribbon cassette 30. Then, when some key is pushed on the keyboard 4, rewinding of the printing tape 22 is begun. In this way, by starting the tape rewinding operation after the prescribed amount of time has passed, or at the moment of a key being pressed, it is possible to avoid tape jamming which otherwise may be caused by starting the rewinding operation of the printing tape 22 during the removal operation of the ribbon cassette 30 and the printing tape is brought into contact with the ink ribbon, harming the printing surface of the printing tape 22 and preventing rewinding operation of the printing tape 22.

Further, the leading end of the tape can be detected when the printing tape 22 is being rewound based on the tape detection signal TS which is switched from "tape exist" to "tape non-exist". Furthermore, a group of ribbon detection switches 103 can be provided by various sensors, such as proximity switches and photo-interrupters.

Further, it is possible to provide a manipulation member instead of the cassette cover for performing head releasing operation of the head releasing mechanism 70. Furthermore, photo-interrupter can be used as a cover open/close detection switch 102.

Further, the tape cutting mechanism 80, 80A can be provided by using a pair of movable blades movable toward each other for cutting. A tape detection sensor 91, 91A can be provided by using various detection switch.

Further, in the illustrated embodiment, the particular tape portion in confrontation with the print head is set as the point of origin for starting printing operation thereat when the tape detection unit 90 detects the leading edge of the tape. However, the tape detection unit can be adapted to detect another predetermined position of the tape instead of the leading edge thereof so as to set the point of origin.

Further, it goes without saying that the tape-shaped label printing device according to the present, invention can be applied to various device such that the a print data in the form of a text is transmitted from an external equipment such as a on-line connected computer, and multicolor printing operations are successively performed by sequentially exchanging a ribbon cassette with a new cassette having a color different from that of the precedent ribbon cassette.

What is claimed is:

1. A tape cassette for use with a printing device that includes a tape drive, pins, a print head, an array of sensors, and a drive shaft, the tape cassette comprising:

printing tape; and a cassette casing*;*

*wherein:*

[housing] *the cassette casing houses* the printing tape and [defining] *defines* four corners and a feed path through which the printing tape moves in a feeding direction[,]*;* the cassette casing [defining] *defines* a head recess adapted to receive the print head of the printing device[,]*;* the cassette casing [further defining] *defines* a recess [to receive] *for receiving* the drive shaft adjacent a first corner of the four corners of the cassette casing downstream of, and spaced from, the head recess in the feeding direction, and adapted to engage the tape drive of the printing device to feed the printing tape in the feeding direction[,]*;* the cassette casing [defining] *defines* a first positioning hole adjacent the drive shaft and a second positioning hole spaced from the drive shaft, the first and second positioning holes communicating with the pins of the printing device to ensure a proper positioning of the cassette casing within the printing device, *when the tape cassette is installed in the printing device;* the cassette casing [defining] *defines* a detector surface adapted to interact with the array of sensors of the printing device to identify at least one characteristic of the tape cassette, the detector surface positioned absolutely at a second corner of the four corners, the second corner positioned diagonally opposite the first corner[,]; *and* the detector surface [defining] *defines* multiple sensor holes that interact with the array of sensors of the printing device, *when the tape cassette is installed in the printing device*.

2. A tape cassette for a printing device that includes a printing head support, a tape drive, pins, and an array of sensors, the tape cassette comprising:

tape; and a cassette casing;

*wherein:*

[housing] *the cassette casing houses* the tape and [defining] *defines* a feed path through which the tape moves in a feeding direction[,];

the cassette casing [defining] *defines* a head recess adapted to accommodate the printing head support of the printing device[,];

the cassette casing [defining] *defines* a tape exit portion proximate the head recess where the tape exits the cassette casing after being printed[,];

the cassette casing [further including] *includes* a drive roller disposed downstream of, and spaced from, the head recess in the feeding direction and adapted to engage the tape drive of the printing device to feed the tape in the feeding direction[,];

the cassette casing [defining] *defines* a first positioning hole adjacent the drive roller and a second positioning hole spaced from the drive roller, the first and second positioning holes communicating with pins of the printing device to ensure proper positioning of the cassette casing within the printing device, *when the tape cassette is installed in the printing device;* the cassette casing [including] *includes* a sensor portion having a surface adapted to interact with the array of sensors of the printing device to identify at least one characteristic of the tape cassette, the sensor portion being located absolutely at a corner position of the cassette casing most distant from the tape exit portion[,]; *and* the surface of the sensor portion [defining] *defines* multiple sensor holes that interact with the array of sensors of the printing device, *when the tape cassette is installed in the printing device*.

3. A tape cassette for a printing device that includes a printing head support, a tape drive, pins, and an array of sensors, the tape cassette comprising:

tape; and a generally rectangular cassette casing that is bounded by four corners[,];

*wherein:* the cassette casing [housing] *houses* the tape and [defining] *defines* a feed path through which the tape moves in a feeding direction[,];

the cassette casing [defining] *defines* a head recess adapted to accommodate the printing head support of the printing device[,];

the cassette casing [defining] *defines* a tape exit portion proximate the head recess and adjacent a first corner of the four corners[,];

the cassette casing [further including] *includes* a drive roller disposed downstream of, and spaced from, the head recess in the feeding direction and adapted to engage the tape drive of the printing device to feed the tape in the feeding direction[,];

the cassette casing [defining] *defines* a first positioning hole adjacent the drive roller and a second positioning hole spaced from the drive roller, the first and second positioning holes communicating with pins of the printing device to ensure proper positioning of the cassette casing within the printing device, *when the tape cassette is installed in the printing device;* the cassette casing [including] *includes* a sensor portion having a surface adapted to interact with the array of sensors of the printing device to identify at least one characteristic of the tape cassette, the sensor portion being located absolutely at a second corner of the four corners positioned diagonally from the first corner[,]; *and* the surface of the sensor portion [defining] *defines* multiple sensor holes that interact with the array of sensors of the printing device, *when the tape cassette is installed in the printing device*.

4. A tape cassette for a printing device that includes a print head, a tape drive, pins, and an array of sensors, the tape cassette comprising:

printing tape; and a cassette casing;

*wherein:*

[defining] *the cassette casing defines* upper and lower surfaces and a lateral surface extending between the upper and lower surfaces[,];

the cassette casing [housing] *houses* the printing tape and [defining] *defines* a feed path through which the printing tape moves in a feeding direction[,];

the cassette casing [defining] *defines* a head recess adapted to receive the print head of the printing device[,];

the cassette casing [forming] *forms* a generally rectangular shape that is bounded by four corners[,];

the cassette casing [further including] *includes* a drive roller adjacent a first corner of the four corners of the cassette casing downstream of, and spaced from, the head recess in the feeding direction and adapted to engage the tape drive of the printing device to feed the tape in the feeding direction[,];

the cassette casing [defining] *defines* a first positioning hole adjacent the drive roller and a second positioning hole spaced from the drive roller, the first and second positioning holes communicating with pins of the printing device to ensure proper positioning of the cassette casing within the printing device, *when the tape cassette is installed in the printing device;* the cassette casing [including] *includes* a flanged portion extending outwardly from the cassette casing substantially perpendicular to the lateral surface and adapted to interact with the array of sensors on the printing device to identify at least one characteristic of the tape cassette[,];

the flanged portion [defining] *defines* an outer edge and multiple sensor holes spaced from the outer edge that interact with the array of sensors of the printing device to facilitate identification of the at least one characteristic device, *when the tape cassette is installed in the printing device;* the flanged portion [being] *is* positioned absolutely at a second corner of the four corners of the cassette casing most distant from the first corner.

5. A printing system, comprising:

a tape cassette;

tape; and a printing device that includes a thermal head, a tape cassette mounting area having a first surface, a printing head support extending from the first surface and supporting the thermal head, a tape exit area proximate the thermal head to allow the tape to exit the tape cassette mounting area, a step portion elevated relative to the first surface, a plurality of sensors arranged on the step portion, the plurality of sensors constituting a complete set of sensors to identify a size of the tape cassette attached in the tape cassette mounting area, a tape drive and positioning pins;

the tape cassette being adapted to be mounted in the tape cassette mounting area, the tape cassette housing the tape and defining a feed path through which the tape moves in a feeding direction, the tape cassette having a head recess formed therein to accommodate the printing head support and a bottom surface facing toward the first surface of the tape cassette mounting area when the tape cassette is mounted in the tape cassette mounting area, the tape cassette further including a detection area elevated relative to the bottom surface, the detection area defining a detector surface facing the plurality of sensors when the tape cassette is mounted in the tape cassette mounting area, the detector surface defining multiple sensor holes and being configured to interact with selected ones of the plurality of sensors to identify the size of the tape cassette, detector surface being located absolutely at a corner position diagonally opposite the tape exit area, the tape cassette further including a drive roller disposed downstream of, and spaced from, the head recess in the feeding direction and adapted to engage the tape drive of the printing device to feed the tape in the feeding direction, the tape cassette defining a first positioning hole adjacent the drive roller and a second positioning hole spaced from the drive roller, the first and second positioning holes communicating with the positioning pins of the printing device to ensure proper positioning of the tape cassette within the printing device.

*6. A tape cassette for use with a printing device that includes a print head, a drive roller, and an array of sensors, the tape cassette comprising:*

*printing tape; and*

*a cassette casing housing the printing tape, the cassette casing having first and second corners and defining:*

*a feed path through which the printing tape moves in a feeding direction;*

*a head recess adapted to receive the print head of the printing device;*

*a recess disposed adjacent the first corner of the cassette casing and downstream of the head recess in the feeding direction, the drive roller of the printing device being receivable within the recess so as to be able to contact the printing tape on the feed path without contacting the cassette casing; and*

*a detector surface adapted to interact with the array of sensors of the printing device to identify at least one characteristic of at least one of the tape cassette and printing tape when the tape cassette is installed in the printing device, the detector surface being disposed absolutely at the second corner of the cassette casing;*

*wherein the second corner is diagonally opposite the first corner.*

* * * * *